United States Patent
Cheng et al.

(10) Patent No.: US 12,255,792 B2
(45) Date of Patent: *Mar. 18, 2025

(54) TAGGING PACKETS FOR MONITORING AND ANALYSIS

(71) Applicant: VMware LLC, Palo Alto, CA (US)

(72) Inventors: Xi Cheng, Beijing (CN); Caixia Jiang, Beijing (CN); Dongrui Mo, Beijing (CN); Jingchun Jason Jiang, Beijing (CN); Xiaoyan Jin, Beijing (CN); Qiong Wang, Beijing (CN); Donghai Han, Beijing (CN)

(73) Assignee: VMWare LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,632

(22) Filed: Sep. 25, 2023

(65) Prior Publication Data

US 2024/0031258 A1 Jan. 25, 2024

Related U.S. Application Data

(63) Continuation of application No. 17/507,453, filed on Oct. 21, 2021, now Pat. No. 11,855,862.

(30) Foreign Application Priority Data

Sep. 17, 2021 (WO) ............... PCT/CN2021/119019

(51) Int. Cl.
*H04L 43/028* (2022.01)
*G06F 9/455* (2018.01)
(Continued)

(52) U.S. Cl.
CPC ........ *H04L 43/028* (2013.01); *G06F 9/45558* (2013.01); *H04L 43/04* (2013.01);
(Continued)

(58) Field of Classification Search
CPC ....... H04L 43/028; H04L 43/04; H04L 43/10; H04L 47/2483; H04L 69/22; G06F 9/45558; G06F 2009/455
See application file for complete search history.

(56) References Cited

U.S. PATENT DOCUMENTS

| 5,224,100 A | 6/1993 | Lee et al. |
| 5,245,609 A | 9/1993 | Ofek et al. |

(Continued)

FOREIGN PATENT DOCUMENTS

| EP | 1154601 A1 | 11/2001 |
| EP | 1931084 A1 | 6/2008 |

(Continued)

OTHER PUBLICATIONS

Levin, Anna, et al., "Network Monitoring in Federated Cloud Environment," 2017 IEEE International Conference on Smart Computing, May 29-31, 2017, 6 pages, IEEE, Hong Kong, China.

(Continued)

*Primary Examiner* — Frantz B Jean
(74) *Attorney, Agent, or Firm* — Quarles & Brady LLP

(57) ABSTRACT

Some embodiments provide a method for performing data traffic monitoring. The method processes a packet through a packet processing pipeline that includes multiple stages. At a filtering stage, the method tags the packet with a set of monitoring actions for subsequent stages to perform on the packet based on a determination that the packet matches a particular filter. For each stage of a set of packet processing stages subsequent to the filtering stage, the method (i) executes any monitoring actions specified for the stage to perform on the packet and (ii) sends the packet to a next stage in the packet processing pipeline.

20 Claims, 12 Drawing Sheets

(51) Int. Cl.
  *H04L 43/04* (2022.01)
  *H04L 43/10* (2022.01)
  *H04L 47/2483* (2022.01)
  *H04L 47/41* (2022.01)
  *H04L 69/22* (2022.01)

(52) U.S. Cl.
  CPC .......... *H04L 43/10* (2013.01); *H04L 47/2483* (2013.01); *H04L 47/41* (2013.01); *H04L 69/22* (2013.01); *G06F 2009/45595* (2013.01)

(56) References Cited

U.S. PATENT DOCUMENTS

| | | |
|---|---|---|
| 5,265,092 A | 11/1993 | Soloway et al. |
| 5,504,921 A | 4/1996 | Dev et al. |
| 5,550,816 A | 8/1996 | Hardwick et al. |
| 5,729,685 A | 3/1998 | Chatwani et al. |
| 5,751,967 A | 5/1998 | Raab et al. |
| 5,781,534 A | 7/1998 | Perlman et al. |
| 5,805,819 A | 9/1998 | Chin et al. |
| 6,104,699 A | 8/2000 | Holender et al. |
| 6,104,700 A | 8/2000 | Haddock et al. |
| 6,141,738 A | 10/2000 | Munter et al. |
| 6,219,699 B1 | 4/2001 | McCloghrie et al. |
| 6,253,337 B1 | 6/2001 | Maloney et al. |
| 6,430,160 B1 | 8/2002 | Smith et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,658,002 B1 | 12/2003 | Ross et al. |
| 6,680,934 B1 | 1/2004 | Cain |
| 6,721,334 B1 | 4/2004 | Ketcham |
| 6,785,843 B1 | 8/2004 | McRae et al. |
| 6,882,642 B1 | 4/2005 | Kejriwal et al. |
| 6,941,487 B1 | 9/2005 | Balakrishnan et al. |
| 6,963,585 B1 | 11/2005 | Pennec et al. |
| 6,999,454 B1 | 2/2006 | Crump |
| 7,013,342 B2 | 3/2006 | Riddle |
| 7,047,423 B1 | 5/2006 | Maloney et al. |
| 7,062,559 B2 | 6/2006 | Yoshimura et al. |
| 7,079,544 B2 | 7/2006 | Wakayama et al. |
| 7,180,856 B1 | 2/2007 | Breslau et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,243,143 B1 | 7/2007 | Bullard |
| 7,283,473 B2 | 10/2007 | Arndt et al. |
| 7,315,985 B1 | 1/2008 | Gauvin et al. |
| 7,342,916 B2 | 3/2008 | Das et al. |
| 7,360,158 B1 | 4/2008 | Beeman |
| 7,391,771 B2 | 6/2008 | Orava et al. |
| 7,450,598 B2 | 11/2008 | Chen et al. |
| 7,457,870 B1 | 11/2008 | Lownsbrough et al. |
| 7,463,579 B2 | 12/2008 | Lapuh et al. |
| 7,478,173 B1 | 1/2009 | Delco |
| 7,483,370 B1 | 1/2009 | Dayal et al. |
| 7,555,002 B2 | 6/2009 | Arndt et al. |
| 7,577,131 B2 | 8/2009 | Joseph et al. |
| 7,590,133 B2 | 9/2009 | Hatae et al. |
| 7,602,723 B2 | 10/2009 | Mandato et al. |
| 7,606,260 B2 | 10/2009 | Oguchi et al. |
| 7,627,692 B2 | 12/2009 | Pessi |
| 7,633,955 B1 | 12/2009 | Saraiya et al. |
| 7,639,625 B2 | 12/2009 | Kaminsky et al. |
| 7,643,488 B2 | 1/2010 | Khanna et al. |
| 7,649,851 B2 | 1/2010 | Takashige et al. |
| 7,706,266 B2 | 4/2010 | Plamondon |
| 7,710,874 B2 | 5/2010 | Balakrishnan et al. |
| 7,729,245 B1 | 6/2010 | Breslau et al. |
| 7,760,735 B1 | 7/2010 | Chen et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,808,919 B2 | 10/2010 | Nadeau et al. |
| 7,808,929 B2 | 10/2010 | Wong et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,937,492 B1 | 5/2011 | Kompella et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,018,943 B1 | 9/2011 | Pleshek et al. |
| 8,024,478 B2 | 9/2011 | Patel |
| 8,027,354 B1 | 9/2011 | Portolani et al. |
| 8,031,606 B2 | 10/2011 | Memon et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,161,270 B1 | 4/2012 | Parker et al. |
| 8,166,201 B2 | 4/2012 | Richardson et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,254,273 B2 | 8/2012 | Kaminsky et al. |
| 8,265,062 B2 | 9/2012 | Tang et al. |
| 8,265,075 B2 | 9/2012 | Pandey |
| 8,281,067 B2 | 10/2012 | Stolowitz |
| 8,290,137 B2 | 10/2012 | Yurchenko et al. |
| 8,306,043 B2 | 11/2012 | Breslau et al. |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,558 B2 | 1/2013 | Nicholson et al. |
| 8,351,418 B2 | 1/2013 | Zhao et al. |
| 8,359,576 B2 | 1/2013 | Prasad et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,571,031 B2 | 10/2013 | Davies et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,644,188 B1 | 2/2014 | Brandwine et al. |
| 8,645,952 B2 | 2/2014 | Biswas et al. |
| 8,713,467 B1 | 4/2014 | Goldenberg et al. |
| 8,750,288 B2 | 6/2014 | Nakil et al. |
| 8,762,501 B2 | 6/2014 | Kempf et al. |
| 8,806,005 B2 | 8/2014 | Miri et al. |
| 8,837,300 B2 | 9/2014 | Nedeltchev et al. |
| 8,838,743 B2 | 9/2014 | Lewites et al. |
| 8,929,221 B2 | 1/2015 | Breslau et al. |
| 8,934,495 B1 | 1/2015 | Hilton et al. |
| 9,059,926 B2 | 6/2015 | Akhter et al. |
| 9,197,529 B2 | 11/2015 | Ganichev et al. |
| 9,226,220 B2 | 12/2015 | Banks et al. |
| 9,258,195 B1 | 2/2016 | Pendleton et al. |
| 9,280,448 B2 | 3/2016 | Farrell et al. |
| 9,282,019 B2 | 3/2016 | Ganichev et al. |
| 9,311,670 B2 | 4/2016 | Hoffberg |
| 9,344,349 B2 | 5/2016 | Ganichev et al. |
| 9,407,580 B2 | 8/2016 | Ganichev et al. |
| 9,602,334 B2 | 3/2017 | Benny |
| 9,658,983 B1 | 5/2017 | Barber et al. |
| 9,729,433 B2 | 8/2017 | Polland |
| 9,860,151 B2 | 1/2018 | Ganichev et al. |
| 9,898,317 B2 | 2/2018 | Nakil et al. |
| 10,044,581 B1 | 8/2018 | Russell |
| 10,181,993 B2 | 1/2019 | Ganichev et al. |
| 10,200,306 B2 | 2/2019 | Nhu et al. |
| 10,225,309 B1 | 3/2019 | Rosenzweig et al. |
| 10,469,342 B2 | 11/2019 | Lenglet et al. |

(56) References Cited

U.S. PATENT DOCUMENTS

| | | |
|---|---|---|
| 10,608,887 B2 | 3/2020 | Jain et al. |
| 10,728,121 B1 | 7/2020 | Chitalia et al. |
| 10,778,557 B2 | 9/2020 | Ganichev et al. |
| 10,805,239 B2 | 10/2020 | Nhu et al. |
| 11,075,847 B1 * | 7/2021 | Kwan .................... H04L 47/33 |
| 11,088,916 B1 | 8/2021 | Chandrashekhar et al. |
| 11,128,550 B2 | 9/2021 | Lenglet et al. |
| 11,196,628 B1 | 12/2021 | Shen et al. |
| 11,201,808 B2 | 12/2021 | Ganichev et al. |
| 11,240,163 B2 | 2/2022 | Chen et al. |
| 11,258,763 B2 | 2/2022 | Cummins et al. |
| 11,283,699 B2 | 3/2022 | Chen et al. |
| 11,336,533 B1 | 5/2022 | Bogado et al. |
| 11,336,590 B2 | 5/2022 | Nhu et al. |
| 11,558,426 B2 | 1/2023 | Shen et al. |
| 11,570,090 B2 | 1/2023 | Shen et al. |
| 11,620,338 B1 | 4/2023 | Bullard et al. |
| 11,677,645 B2 | 6/2023 | Cheng et al. |
| 11,687,210 B2 | 6/2023 | Parashar et al. |
| 11,706,109 B2 | 7/2023 | Cheng et al. |
| 11,711,278 B2 | 7/2023 | Gajar et al. |
| 11,736,436 B2 | 8/2023 | Nigam et al. |
| 2001/0020266 A1 | 9/2001 | Kojima et al. |
| 2001/0043614 A1 | 11/2001 | Viswanadham et al. |
| 2002/0093952 A1 | 7/2002 | Gonda |
| 2002/0112060 A1 | 8/2002 | Kato |
| 2002/0178356 A1 | 11/2002 | Mattila |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0067497 A1 | 4/2003 | Pichon |
| 2003/0197702 A1 | 10/2003 | Turner et al. |
| 2004/0024879 A1 | 2/2004 | Dingman et al. |
| 2004/0073659 A1 | 4/2004 | Rajsic et al. |
| 2004/0098505 A1 | 5/2004 | Clemmensen |
| 2004/0186914 A1 | 9/2004 | Shimada |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0105524 A1 | 5/2005 | Stevens et al. |
| 2005/0111445 A1 | 5/2005 | Wybenga et al. |
| 2005/0120160 A1 | 6/2005 | Plouffe et al. |
| 2005/0132044 A1 | 6/2005 | Guingo et al. |
| 2005/0149604 A1 | 7/2005 | Navada |
| 2005/0182853 A1 | 8/2005 | Lewites et al. |
| 2005/0220030 A1 | 10/2005 | Nagami et al. |
| 2005/0220096 A1 | 10/2005 | Friskney et al. |
| 2005/0232230 A1 | 10/2005 | Nagami et al. |
| 2006/0002370 A1 | 1/2006 | Rabie et al. |
| 2006/0026225 A1 | 2/2006 | Canali et al. |
| 2006/0028999 A1 | 2/2006 | Iakobashvili et al. |
| 2006/0029056 A1 | 2/2006 | Perera et al. |
| 2006/0037075 A1 | 2/2006 | Frattura et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0206655 A1 | 9/2006 | Chappell et al. |
| 2006/0218447 A1 | 9/2006 | Garcia et al. |
| 2006/0221961 A1 | 10/2006 | Basso et al. |
| 2006/0282895 A1 | 12/2006 | Rentzis et al. |
| 2006/0291388 A1 | 12/2006 | Amdahl et al. |
| 2007/0050763 A1 | 3/2007 | Kagan et al. |
| 2007/0055789 A1 | 3/2007 | Claise et al. |
| 2007/0064673 A1 | 3/2007 | Bhandaru et al. |
| 2007/0097982 A1 | 5/2007 | Wen et al. |
| 2007/0156919 A1 | 7/2007 | Potti et al. |
| 2007/0260721 A1 | 11/2007 | Bose et al. |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0021925 A1 | 1/2008 | Sweeney |
| 2008/0049614 A1 | 2/2008 | Briscoe et al. |
| 2008/0049621 A1 | 2/2008 | McGuire et al. |
| 2008/0049752 A1 | 2/2008 | Grant |
| 2008/0049786 A1 | 2/2008 | Ram et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0112551 A1 | 5/2008 | Forbes et al. |
| 2008/0159301 A1 | 7/2008 | Heer |
| 2008/0240095 A1 | 10/2008 | Basturk |
| 2009/0010254 A1 | 1/2009 | Shimada |
| 2009/0100298 A1 | 4/2009 | Lange et al. |
| 2009/0109973 A1 | 4/2009 | Ilnicki |
| 2009/0116497 A1 | 5/2009 | Varma et al. |
| 2009/0150527 A1 | 6/2009 | Tripathi et al. |
| 2009/0245138 A1 | 10/2009 | Sapsford et al. |
| 2009/0248895 A1 | 10/2009 | Archer et al. |
| 2009/0249213 A1 | 10/2009 | Murase et al. |
| 2009/0292858 A1 | 11/2009 | Lambeth et al. |
| 2009/0327903 A1 | 12/2009 | Smith et al. |
| 2010/0128623 A1 | 5/2010 | Dunn et al. |
| 2010/0131636 A1 | 5/2010 | Suri et al. |
| 2010/0188976 A1 | 7/2010 | Rahman et al. |
| 2010/0214949 A1 | 8/2010 | Smith et al. |
| 2010/0232435 A1 | 9/2010 | Jabr et al. |
| 2010/0254385 A1 | 10/2010 | Sharma et al. |
| 2010/0275199 A1 | 10/2010 | Smith et al. |
| 2010/0306408 A1 | 12/2010 | Greenberg et al. |
| 2010/0332626 A1 | 12/2010 | Jönsson et al. |
| 2011/0022695 A1 | 1/2011 | Dalal et al. |
| 2011/0055389 A1 | 3/2011 | Bley |
| 2011/0055710 A1 | 3/2011 | Kirkby et al. |
| 2011/0063979 A1 | 3/2011 | Matthews et al. |
| 2011/0075664 A1 | 3/2011 | Lambeth et al. |
| 2011/0085557 A1 | 4/2011 | Gnanasekaran et al. |
| 2011/0085559 A1 | 4/2011 | Chung et al. |
| 2011/0085563 A1 | 4/2011 | Kotha et al. |
| 2011/0107271 A1 | 5/2011 | Borchardt et al. |
| 2011/0128959 A1 | 6/2011 | Bando et al. |
| 2011/0137602 A1 | 6/2011 | Desineni et al. |
| 2011/0194567 A1 | 8/2011 | Shen |
| 2011/0202920 A1 | 8/2011 | Takase |
| 2011/0261825 A1 | 10/2011 | Ichino |
| 2011/0265023 A1 | 10/2011 | Loomis et al. |
| 2011/0299413 A1 | 12/2011 | Chatwani et al. |
| 2011/0299534 A1 | 12/2011 | Koganti et al. |
| 2011/0299537 A1 | 12/2011 | Saraiya et al. |
| 2011/0305167 A1 | 12/2011 | Koide |
| 2011/0317559 A1 | 12/2011 | Kern et al. |
| 2011/0317696 A1 | 12/2011 | Aldrin et al. |
| 2012/0079478 A1 | 3/2012 | Galles et al. |
| 2012/0151352 A1 | 6/2012 | Ramprasad et al. |
| 2012/0159454 A1 | 6/2012 | Barham et al. |
| 2012/0182992 A1 | 7/2012 | Cowart et al. |
| 2012/0191432 A1 | 7/2012 | Khataniar et al. |
| 2012/0275331 A1 | 11/2012 | Benkö et al. |
| 2012/0287791 A1 | 11/2012 | Xi et al. |
| 2012/0311131 A1 | 12/2012 | Arrasvuori |
| 2012/0314599 A1 | 12/2012 | Vilke et al. |
| 2013/0010600 A1 | 1/2013 | Jocha et al. |
| 2013/0019008 A1 | 1/2013 | Jorgenson et al. |
| 2013/0024579 A1 | 1/2013 | Zhang et al. |
| 2013/0031233 A1 | 1/2013 | Feng et al. |
| 2013/0041934 A1 | 2/2013 | Annamalaisami et al. |
| 2013/0044636 A1 | 2/2013 | Koponen et al. |
| 2013/0054625 A1 | 2/2013 | Bhagwan et al. |
| 2013/0054761 A1 | 2/2013 | Kempf et al. |
| 2013/0058346 A1 | 3/2013 | Sridharan et al. |
| 2013/0067067 A1 | 3/2013 | Miri et al. |
| 2013/0097329 A1 | 4/2013 | Alex et al. |
| 2013/0125120 A1 | 5/2013 | Zhang et al. |
| 2013/0136127 A1 | 5/2013 | Hill et al. |
| 2013/0163427 A1 | 6/2013 | Beliveau et al. |
| 2013/0163475 A1 | 6/2013 | Beliveau et al. |
| 2013/0294249 A1 | 11/2013 | Lin et al. |
| 2013/0332602 A1 | 12/2013 | Nakil et al. |
| 2013/0332983 A1 | 12/2013 | Koorevaar et al. |
| 2013/0339544 A1 | 12/2013 | Mithyantha |
| 2013/0346487 A1 | 12/2013 | Tanimoto |

(56) References Cited

U.S. PATENT DOCUMENTS

| | | |
|---|---|---|
| 2014/0019639 A1 | 1/2014 | Ueno |
| 2014/0029451 A1 | 1/2014 | Nguyen |
| 2014/0115578 A1 | 4/2014 | Cooper et al. |
| 2014/0119203 A1 | 5/2014 | Sundaram et al. |
| 2014/0126418 A1 | 5/2014 | Brendel et al. |
| 2014/0157405 A1 | 6/2014 | Joll et al. |
| 2014/0177633 A1 | 6/2014 | Manula et al. |
| 2014/0195666 A1 | 7/2014 | Dumitriu et al. |
| 2014/0207926 A1 | 7/2014 | Benny |
| 2014/0219086 A1 | 8/2014 | Cantu' et al. |
| 2014/0281030 A1 | 9/2014 | Cui et al. |
| 2014/0282823 A1 | 9/2014 | Rash et al. |
| 2014/0297846 A1 | 10/2014 | Hoja et al. |
| 2014/0304393 A1 | 10/2014 | Annamalaisami et al. |
| 2014/0317313 A1 | 10/2014 | Okita et al. |
| 2014/0348184 A1 | 11/2014 | Kure |
| 2014/0351415 A1 | 11/2014 | Harrigan et al. |
| 2014/0380176 A1 | 12/2014 | Arquie et al. |
| 2015/0016286 A1 | 1/2015 | Ganichev et al. |
| 2015/0016287 A1 | 1/2015 | Ganichev et al. |
| 2015/0016298 A1 | 1/2015 | Ganichev et al. |
| 2015/0016460 A1 | 1/2015 | Zhang et al. |
| 2015/0016469 A1 | 1/2015 | Ganichev et al. |
| 2015/0043378 A1 | 2/2015 | Bardgett et al. |
| 2015/0163330 A1 | 6/2015 | Ni et al. |
| 2015/0180755 A1 | 6/2015 | Zhang et al. |
| 2015/0195169 A1 | 7/2015 | Liu et al. |
| 2015/0263899 A1 | 9/2015 | Tubaltsev et al. |
| 2015/0271011 A1 | 9/2015 | Neginhal et al. |
| 2015/0281036 A1 | 10/2015 | Sun et al. |
| 2016/0105333 A1 | 4/2016 | Lenglet et al. |
| 2016/0119204 A1 | 4/2016 | Murasato et al. |
| 2016/0142291 A1 | 5/2016 | Polland |
| 2016/0149784 A1 | 5/2016 | Zhang et al. |
| 2016/0149791 A1 | 5/2016 | Ganichev et al. |
| 2016/0205174 A1 | 7/2016 | Pitio et al. |
| 2016/0226741 A1 | 8/2016 | Ganichev et al. |
| 2016/0226742 A1 | 8/2016 | Apathotharanan et al. |
| 2016/0274558 A1 | 9/2016 | Strohmenger et al. |
| 2016/0323166 A1 | 11/2016 | Pandey et al. |
| 2016/0359712 A1 | 12/2016 | Attar et al. |
| 2016/0359740 A1 | 12/2016 | Parandehgheibi et al. |
| 2016/0359880 A1 | 12/2016 | Pang et al. |
| 2017/0026270 A1 | 1/2017 | Shankar |
| 2017/0093677 A1 | 3/2017 | Skerry et al. |
| 2017/0126728 A1 | 5/2017 | Beam et al. |
| 2017/0171159 A1* | 6/2017 | Kumar ............... G06F 9/45558 |
| 2017/0180423 A1 | 6/2017 | Nimmagadda et al. |
| 2017/0222881 A1 | 8/2017 | Holbrook et al. |
| 2017/0288991 A1 | 10/2017 | Ganesh |
| 2017/0302530 A1 | 10/2017 | Wolting |
| 2017/0310574 A1 | 10/2017 | Wolting |
| 2017/0317954 A1 | 11/2017 | Masurekar et al. |
| 2017/0324778 A1 | 11/2017 | Register et al. |
| 2017/0358111 A1 | 12/2017 | Madsen |
| 2017/0373950 A1 | 12/2017 | Szilagyi et al. |
| 2018/0041470 A1 | 2/2018 | Schultz et al. |
| 2018/0062939 A1 | 3/2018 | Kulkarni et al. |
| 2018/0063188 A1 | 3/2018 | Karin et al. |
| 2018/0091388 A1 | 3/2018 | Levy et al. |
| 2018/0102959 A1 | 4/2018 | Ganichev et al. |
| 2018/0113790 A1 | 4/2018 | Chunduri et al. |
| 2018/0123903 A1 | 5/2018 | Holla et al. |
| 2018/0124171 A1* | 5/2018 | Han ....................... H04L 45/566 |
| 2018/0136798 A1 | 5/2018 | Aggour et al. |
| 2018/0181754 A1 | 6/2018 | Gunda |
| 2018/0219751 A1 | 8/2018 | Cavuto et al. |
| 2018/0262447 A1 | 9/2018 | Nhu et al. |
| 2018/0262594 A1 | 9/2018 | Nhu et al. |
| 2018/0309637 A1 | 10/2018 | Gill et al. |
| 2018/0373961 A1 | 12/2018 | Wang et al. |
| 2018/0375728 A1 | 12/2018 | Gangil et al. |
| 2019/0014029 A1 | 1/2019 | Burgio et al. |
| 2019/0109769 A1 | 4/2019 | Jain et al. |
| 2019/0129738 A1 | 5/2019 | Ekbote et al. |
| 2019/0140931 A1 | 5/2019 | Ganichev et al. |
| 2019/0149525 A1 | 5/2019 | Gunda et al. |
| 2019/0158377 A1 | 5/2019 | Chau |
| 2019/0190804 A1 | 6/2019 | Tang et al. |
| 2019/0306060 A1 | 10/2019 | Sharma |
| 2020/0014663 A1 | 1/2020 | Chen et al. |
| 2020/0036636 A1 | 1/2020 | Holla et al. |
| 2020/0067799 A1 | 2/2020 | Lenglet et al. |
| 2020/0076734 A1 | 3/2020 | Naveen et al. |
| 2020/0106744 A1 | 4/2020 | Miriyala et al. |
| 2020/0136943 A1 | 4/2020 | Banyai et al. |
| 2020/0169475 A1 | 5/2020 | Nagarkar et al. |
| 2020/0169476 A1 | 5/2020 | Vela et al. |
| 2020/0186453 A1 | 6/2020 | Zhang et al. |
| 2020/0204457 A1 | 6/2020 | Hu et al. |
| 2020/0210195 A1 | 7/2020 | Lampert et al. |
| 2020/0304389 A1 | 9/2020 | Bauan et al. |
| 2020/0313985 A1 | 10/2020 | Jayakumar et al. |
| 2020/0322243 A1 | 10/2020 | Xi et al. |
| 2020/0322249 A1 | 10/2020 | Liu et al. |
| 2020/0336387 A1 | 10/2020 | Suzuki et al. |
| 2020/0342346 A1 | 10/2020 | Wulff et al. |
| 2021/0014157 A1 | 1/2021 | Zhou |
| 2021/0028996 A1 | 1/2021 | Mordani et al. |
| 2021/0029059 A1 | 1/2021 | Nhu et al. |
| 2021/0051100 A1 | 2/2021 | Chitalia et al. |
| 2021/0051109 A1 | 2/2021 | Chitalia et al. |
| 2021/0092064 A1 | 3/2021 | Sidebottom et al. |
| 2021/0194931 A1 | 6/2021 | Parashar et al. |
| 2021/0216908 A1 | 7/2021 | Lu et al. |
| 2021/0218630 A1 | 7/2021 | Lu et al. |
| 2021/0218652 A1 | 7/2021 | Raut et al. |
| 2021/0224183 A1* | 7/2021 | Péan .................... H04L 43/028 |
| 2021/0226875 A1 | 7/2021 | Chen et al. |
| 2021/0226880 A1* | 7/2021 | Ramamoorthy ........ H04L 41/40 |
| 2021/0226898 A1 | 7/2021 | Chen et al. |
| 2021/0266259 A1 | 8/2021 | Renner, III et al. |
| 2021/0311764 A1 | 10/2021 | Rosoff et al. |
| 2021/0328891 A1 | 10/2021 | Cherkas |
| 2021/0367927 A1 | 11/2021 | Selvaraj et al. |
| 2021/0377288 A1 | 12/2021 | Kaidi |
| 2022/0014451 A1 | 1/2022 | Naik et al. |
| 2022/0021616 A1 | 1/2022 | Amal et al. |
| 2022/0038368 A1 | 2/2022 | Shen et al. |
| 2022/0038501 A1 | 2/2022 | Shen et al. |
| 2022/0103452 A1 | 3/2022 | Ganichev et al. |
| 2022/0103460 A1 | 3/2022 | Yu et al. |
| 2022/0150136 A1 | 5/2022 | Chen |
| 2022/0155948 A1 | 5/2022 | Chaudhari et al. |
| 2022/0165035 A1 | 5/2022 | Cui et al. |
| 2022/0210120 A1 | 6/2022 | Nigam et al. |
| 2022/0217068 A1 | 7/2022 | Chen et al. |
| 2022/0224620 A1 | 7/2022 | Chhabra et al. |
| 2022/0263721 A1 | 8/2022 | Bogado et al. |
| 2023/0006886 A1 | 1/2023 | Parashar et al. |
| 2023/0023956 A1 | 1/2023 | Gajjar et al. |
| 2023/0039791 A1 | 2/2023 | Paladugu et al. |
| 2023/0052974 A1 | 2/2023 | Thoria et al. |
| 2023/0087143 A1 | 3/2023 | Cheng et al. |
| 2023/0087454 A1 | 3/2023 | Cheng et al. |
| 2023/0101764 A1 | 3/2023 | Cheng et al. |
| 2023/0123136 A1 | 4/2023 | Deb et al. |
| 2023/0179513 A1 | 6/2023 | Shen et al. |
| 2023/0198859 A1 | 6/2023 | Parashar et al. |
| 2023/0280880 A1 | 9/2023 | Parashar et al. |

FOREIGN PATENT DOCUMENTS

| | | |
|---|---|---|
| JP | 2002141905 A | 5/2002 |
| JP | 2003069609 A | 3/2003 |
| JP | 2003124976 A | 4/2003 |
| JP | 2003318949 A | 11/2003 |
| WO | 9506989 A1 | 3/1995 |
| WO | 2012126488 A1 | 9/2012 |

(56) References Cited

FOREIGN PATENT DOCUMENTS

| WO | 2013184846 A1 | 12/2013 |
|---|---|---|
| WO | 2015005968 A1 | 1/2015 |

OTHER PUBLICATIONS

Non-Published commonly Owned U.S. Appl. No. 18/226,776, filed Jul. 27, 2023, 39 pages, VMware, Inc.

Phaal, Peter, et al., "sFlow Version 5," Jul. 2004, 46 pages, available at http://www.sflow.org/sflow_version_5.txt.

Phan, Doantam, et al., "Visual Analysis of Network Flow Data with Timelines and Event Plots," VizSEC 2007, Month Unknown 2007, 16 pages.

* cited by examiner

Collected packet metrics for Packets 1 and 2

| Session ID | Packet ID | Count Result | Trace Result |
|---|---|---|---|
| 5 | 1 | {FW=1} | |
| 5 | 1 | {OR=1} | |
| 5 | 1 | | {FW, rule_id=2, action=allow} |
| 5 | 1 | | {OR, src_vni=5, dst_vni=6} |
| 5 | 2 | {FW=1} | |
| 5 | 2 | | {FW, rule_id=3, action=drop} |

1010

Aggregated packet metrics for Packets 1 and 2

| Session ID | Packet ID | Count Result | Trace Result |
|---|---|---|---|
| 5 | * | {FW=2, OR=1} | |
| 5 | 1 | | [{FW, rule_id=2, action=allow}, {OR, src_vni=5, dst_vni=6}] |
| 5 | 2 | | [{FW, rule_id=3, action=drop}] |

1020

TAGGING PACKETS FOR MONITORING AND ANALYSIS

This application is a continuation application of U.S. patent application Ser. No. 17/507,453, filed Oct. 21, 2021, now patented as U.S. Pat. No. 11,855,862. U.S. patent application Ser. No. 17/507,453 claims the benefit of International Patent Application PCT/CN2021/119019, filed Sep. 17, 2021. These patents and applications are incorporated herein by reference in their entireties for all purposes.

BACKGROUND

Today, network virtualization is crucial for cloud computing infrastructure as it offers preferable network productivity, efficiency, and elasticity by decoupling network services from the underlying hardware and allowing virtual provisioning of network resources. Existing utilities for network troubleshooting, however, work in an end-to-end manner and lack the capability to localize issues on specific virtual network components. Additionally, typical tools provided by network virtualization platforms rely on probing with crafted traffic rather than live traffic, and the number of tools required to adequately debug a network issue tend to make the process of debugging laborious and error-prone due to the manual correlation of data from the multiple tools that is required.

BRIEF SUMMARY

Some embodiments of the invention provide a method for performing data traffic monitoring by tagging packets with information specifying a set of monitoring actions for one or more stages of a packet processing pipeline to perform on the packet. The packet processing pipeline includes a filtering stage that matches packets to a set of filters and, if a packet matches a particular filter, tags the packet with the set of monitoring actions specified by the particular filter. Each additional stage in the packet processing pipeline (i) identifies from the packet which monitoring actions are specified, (ii) determines whether the stage supports those actions, and (iii) performs any monitoring actions that are both specified for the packet and supported by the stage, in addition to performing the standard operations for the stage on the packet.

In some embodiments, the packet processing pipeline is a set of packet processing stages executed by a computing device (e.g., a host computer or edge device) to perform various packet processing operations on packets. The stages, in some embodiments, can include a filtering stage, firewall and/or other service stages, logical switching and/or routing stages, and an encapsulation stage, in addition to other stages. In some embodiments, the stages of a packet processing pipeline are performed by one or more forwarding elements (e.g., software forwarding elements (SFEs)) and/or other modules (e.g., firewall engines, filter engine, etc.) executing on the computing device (e.g., in virtualization software of the computing device).

The filtering stage is the first stage in the packet processing pipeline at the initial computing device (i.e., source computing device), in some embodiments. This filtering stage is configured to match packets against a specified set of characteristics and, when a packet matches those characteristics, tag the packet with a set of monitoring actions (e.g., by writing the set of monitoring actions into the packet's metadata). In some embodiments, the set of characteristics can include a flow identifier (e.g., five-tuple identifier) and/or the source of the packet (e.g., a source machine or source interface that corresponds to a source machine).

Following the filtering stage, packets are processed by a set of intermediate stages. In some embodiments, each of these stage processes a packet by (i) identifying from the packet which monitoring actions (if any) are specified, (ii) determining whether the stage supports those actions, and (iii) performing any monitoring actions that are both specified for the packet and supported by the stage, in addition to performing the standard operations for the stage on the packet. These intermediate stages, in some embodiments, include firewall and/or other service stages that perform services on packets, such as applying firewall and service rules to the packets, as well as logical switching and/or routing stages that perform switching and routing services for the packets.

In some embodiments, to identify which monitoring actions are specified for a packet, a stage reads the set of monitoring actions to be performed from the packet's metadata stored at the computing device. In different embodiments, the packet's tag specifies either a general set of monitoring actions to be executed on the packet or specific monitoring actions for specific stages to execute. In some embodiments, one stage may support a particular monitoring action that is not supported by other stages in the packet processing pipeline, while other monitoring actions are supported by multiple stages that each perform those monitoring actions on packets for which the actions are specified. In some embodiments, a subset of stages in the packet processing pipeline do not support any monitoring actions and only process packets according to configuration data for the stage.

When a stage in the packet processing pipeline determines that a packet specifies one or more monitoring actions that are supported by that stage, the stage executes the monitoring actions on the packet. In some embodiments, the monitoring actions specified for a packet are specified in a priority order. For a stage that supports at least two monitoring actions to be performed on the packet, in some embodiments, the stage executes the at least two monitoring actions on the received packet in the specified priority order (i.e., with higher priority actions executed prior to lower priority actions by the packet processing stage). If a first higher-priority monitoring action modifies the packet, then a second lower-priority monitoring action is executed on the modified packet.

In some embodiments, after any intermediate stages have processed the packet, the packet is processed by an encapsulation stage that encapsulates the packet with an encapsulating header (e.g., a Geneve header, in-band network telemetry (INT) header, etc.) that includes data specifying the monitoring actions (i.e., based on the monitoring actions tagged for the packet). By encapsulating packets with encapsulation headers that specify the monitoring actions, the encapsulation stage enables other computing devices that process the packet to perform the monitoring actions on the packet and to generate additional metrics associated with the packet and the live packet monitoring session.

Examples of other computing devices that process the packet to perform monitoring actions, in some embodiments, can include the destination computing device at which the destination machine executes, an edge device that processes the packet before the packet leaves the logical network, and/or any intermediate devices that process the packet (e.g., devices that enable the packet to be sent from one physical site to another when the logical network spans multiple sites). In some embodiments, each of these computing devices executes a staged packet processing pipeline that operates in a similar manner as described above for the initial computing device (except that these other devices do not apply a filtering stage to the packet).

In some embodiments, the particular filter (i.e., set of characteristics, such as a flow identifier) is specified as part of a live packet monitoring session that a user (e.g., administrator) defines through a network management and control system (e.g., via an application programming interface (API) entry point provided by the network management and control system). The user-defined live packet monitoring session, in some embodiments, also specifies a source machine or source interface that corresponds to a machine from which packets of interest are sent, and the set of monitoring actions to be performed on packets of interest.

Examples of monitoring actions, in some embodiments, include packet tracing, packet capture, and packet counting. In some embodiments, each stage of each packet processing pipeline that supports packet tracing creates a record for each packet that it processes when packet tracing is specified as a monitoring action for the packet. Aggregating the resulting packet metrics produces the path traversed by the packet between its source and destination as well as aggregated metrics. Stages of packet processing pipelines that support packet capture intercept packets tagged for packet capture, and temporarily store the captured packets for analysis. In some embodiments, analyzing packets using packet capture can be useful for granting visibility in order to identify and/or troubleshoot network issues. Packet counting, in some embodiments, provides insight into how many packets (and/or how much data) are received and processed by each packet processing pipeline of each computing device traversed by packet flows for which the live packet monitoring session is performed. In some embodiments, packet count can be useful for identifying packet loss, as well as which packets are being dropped based on packet identifiers associated with the packets. Other monitoring actions in some embodiments may include packet flow statistics accumulation, packet latency measurement, or other packet monitoring measurements. It should be understood that the examples given in this document are not exhaustive of the types of monitoring actions that could be incorporated into the described framework.

The network management and control system, in some embodiments, uses the source machine or source interface specified by the user to determine which computing device should be configured to filter and tag packets for the live packet monitoring session. In some embodiments, the particular filter can define a packet flow or set of packet flows. A packet flow defined by the particular filter, in some embodiments, can be a bidirectional packet flow, in which case the filtering stage is implemented at both the source computing device and the destination computing device (to tag return traffic).

In some embodiments, a centralized data repository (e.g., a datastore at the network controller and/or network manager) is automatically populated with packet metrics generated as a result of a monitoring actions being executed on a packet. The computing devices that perform the monitoring actions provide this data to the centralized repository (e.g., after each stage, after each packet has completed the packet processing pipeline at the device, or at regular intervals). The packet metrics for each packet, in some embodiments, are accompanied by a packet identifier associated with the packet, and a session identifier associated with the live packet monitoring session. Both the packet identifier and session identifier are part of the packet's tag and included in the packet's encapsulation header, according to some embodiments.

Once the live packet monitoring session is terminated (or during the session), the network management and control system aggregates the packets metrics in the repository using the accompanying packet identifiers and session identifier, in some embodiments. For instance, in some embodiments, the packet identifiers are used to correlate different metrics generated from different monitoring actions executed on a packet, while the session identifier is used to aggregate over multiple packets. The network management and control system can then use the aggregated packet metrics to respond to queries at different levels of granularity. For instance, in some embodiments, the network management and control system provides both an aggregated set of session metrics for packets matching the particular filter, and individual packet metrics for at least one packet using the packet identifiers.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
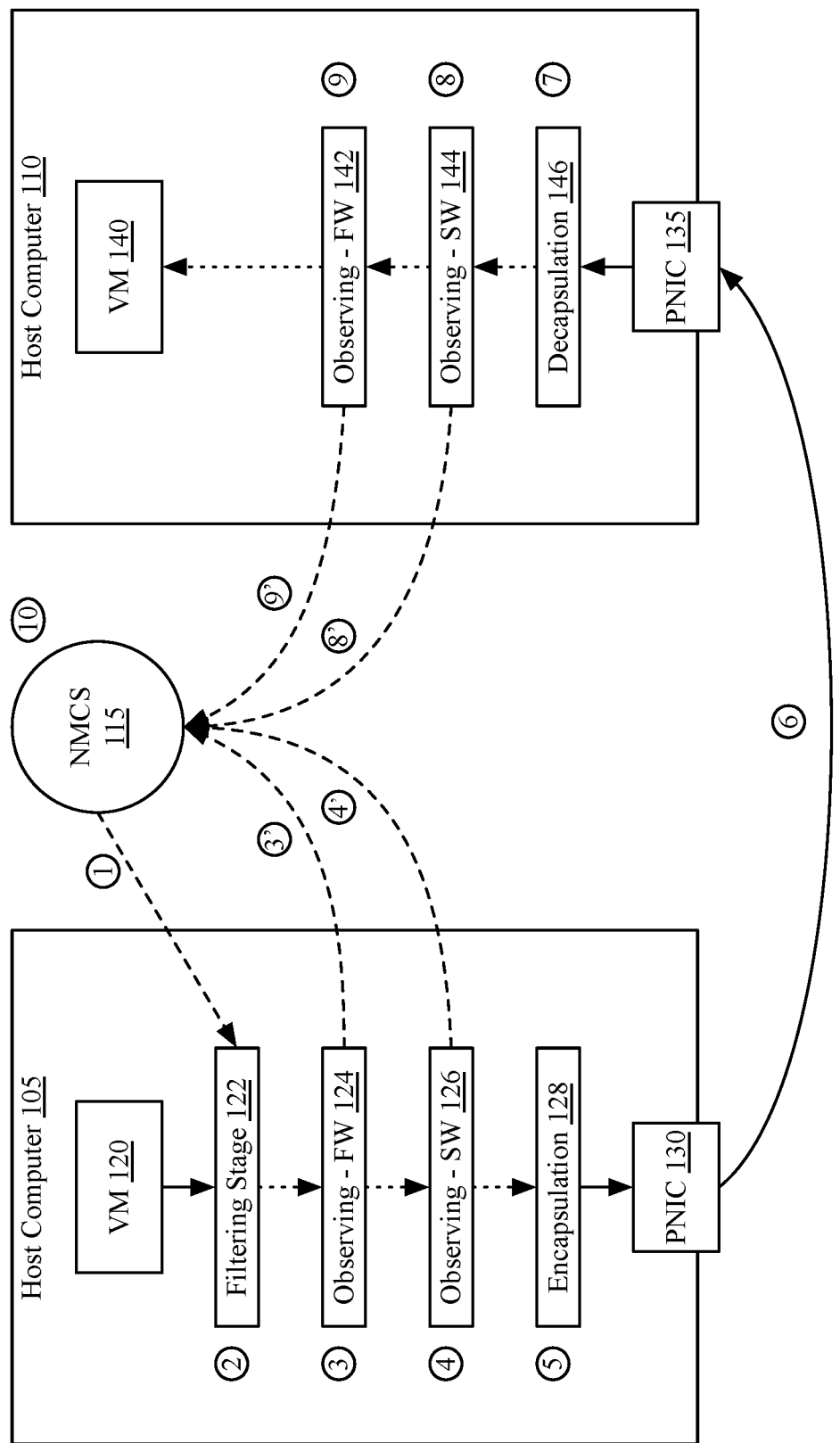
FIG. 1 illustrates an example of a workflow of performing live traffic monitoring on packets between a source machine and a destination machine, in some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for performing data traffic monitoring by tagging packets with information specifying a set of monitoring actions for one or more stages of a packet processing pipeline to perform on the packet. The packet processing pipeline includes a filtering stage that matches packets to a set of filters and, if a packet matches a particular filter, tags the packet with the set of monitoring actions specified by the particular filter. Each additional stage in the packet processing pipeline (i) identifies from the packet which monitoring actions are specified, (ii) determines whether the stage supports those actions, and (iii) performs any monitoring actions that are both specified for the packet and supported by the stage, in addition to performing the standard operations for the stage on the packet.

In some embodiments, the packet processing pipeline is a set of packet processing stages executed by a computing device (e.g., a host computer or edge device) to perform various packet processing operations on packets. The stages, in some embodiments, can include a filtering stage, firewall and/or other service stages, logical switching and/or routing stages, and an encapsulation stage, in addition to other stages. In some embodiments, the stages of a packet processing pipeline are performed by one or more forwarding elements (e.g., software forwarding elements (SFEs)) and/or other modules (e.g., firewall engines, filter engine, etc.) executing on the computing device (e.g., in virtualization software of the computing device).

The filtering stage is the first stage in the packet processing pipeline at the initial computing device (i.e., source computing device), in some embodiments. This filtering stage is configured to match packets against a specified set of characteristics and, when a packet matches those characteristics, tag the packet with a set of monitoring actions (e.g., by writing the set of monitoring actions into the packet's metadata). In some embodiments, the set of characteristics can include a flow identifier (e.g., five-tuple identifier) and/or the source of the packet (e.g., a source machine or source interface that corresponds to a source machine).

Following the filtering stage, packets are processed by a set of intermediate stages. In some embodiments, each of these stage processes a packet by (i) identifying from the packet which monitoring actions (if any) are specified, (ii) determining whether the stage supports those actions, and (iii) performing any monitoring actions that are both specified for the packet and supported by the stage, in addition to performing the standard operations for the stage on the packet. These intermediate stages, in some embodiments, include firewall and/or other service stages that perform services on packets, such as applying firewall and service rules to the packets, as well as logical switching and/or routing stages that perform switching and routing services for the packets. In some embodiments, the packet monitoring actions are incorporated into the intermediate stages (e.g., the firewall stage will also include the determination as to whether to perform any monitoring actions and the performance of those monitoring actions), while in other embodiments the packet monitoring actions are executed as a separate stage (e.g., the determination as to whether to perform any monitoring actions and performance of those monitoring actions for the firewall stage are performed as a separate stage after the execution of the firewall stage).

FIG. 1 illustrates an example of a workflow of some embodiments for performing live traffic monitoring on packets between a source machine and a destination machine. As shown, the source host computer 105 includes a source virtual machine (VM) 120, a physical network interface card (PNIC) 130, and a packet processing pipeline that includes a filtering stage 122, an observing stage for a firewall 124, an observing stage for a virtual switch 126, and an encapsulation stage 128.

Similar to the source host computer 105, the destination host computer 110 includes a destination VM 140, a PNIC 135, and a packet processing pipeline that includes a decapsulation stage 146, an observing stage for a virtual switch 144, and an observing stage for a firewall 142. Different embodiments may include different stages and/or different numbers of stages than illustrated, as indicated by the dashed lines between stages. In addition, it should be noted that while these examples show the source and destination endpoints of data messages as VMs, in other embodiments the source and/or destination endpoints could be other types of data compute nodes (e.g., containers).

Figure 2:
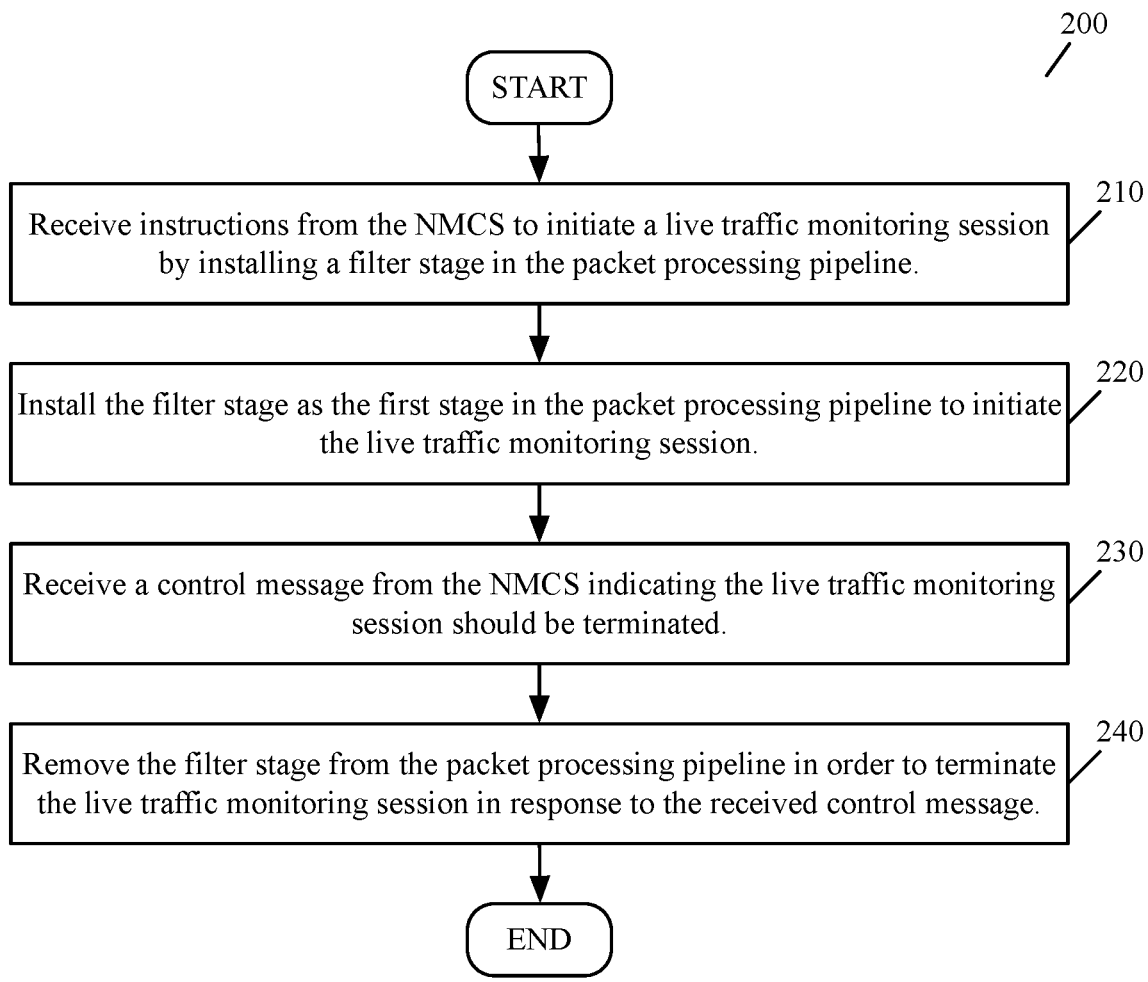
FIG. 2 illustrates a process performed by a source host computer, in some embodiments, to initiate and terminate a live traffic monitoring session.

In order to initiate the live traffic monitoring session, in some embodiments, the network management and control system 115 instructs the source host computer 105 to install the filtering stage 122 as the first stage in the pipeline (e.g., at the encircled 1). For instance, FIG. 2 illustrates a process performed by a source host computer, in some embodiments, to initiate and terminate a live traffic monitoring session. In some embodiments, the process 200 is performed at both the source host computer and the destination host computer when the live traffic monitoring session is specified for a bidirectional flow.

The process 200 starts (at 210) by receiving instructions from the network management and control system to initiate a live traffic monitoring session by installing a filtering stage as the first stage in a packet processing pipeline executed by the source host computer. The network management and control system 115, for example, instructs the host computer 105 to install the filtering stage 122. In some embodiments, the instructions for installing the filtering stage also include configuration data specifying the filter to be used by the filtering stage and monitoring actions to be performed on packets matching the filter. The filtering stage, in some embodiments, is installed as the first stage in the pipeline so that packets for which the live traffic monitoring session is specified (i.e., packets matching a specified filter) can be tagged with the monitoring actions.

The process installs (at 220) the filtering stage as the first stage in the packet processing pipeline to initiate the live traffic monitoring session. Once the filtering stage is installed, it can begin to determine whether packets sent from the VM 120 match the filter specified for the live traffic monitoring session. Once the session is initiated, each of the subsequent packet processing stages 124-126 on the source host computer process the packets and perform monitoring actions specified for tagged packets (e.g., at the encircled 3 and 4). As each stage performs monitoring actions on tagged packets, packet metrics generated by the monitoring actions are sent to the network management and control system 115 (e.g., at the encircled 3' and 4'). The packets are then encapsulated by the encapsulation stage 128 (e.g., at the encircled and sent from the physical network interface card (PNIC) 130 of the source host computer 105 to the PNIC 135 at the destination host computer 110 (e.g., at the encircled 6).

On the destination host computer 110, the decapsulation stage 146 decapsulates encapsulated packets (e.g., at the encircled 7) and provides the decapsulated packets to the subsequent packet processing stages 144 and 142. The stages 142 and 144 process the packets, perform monitoring actions specified for tagged packets (e.g., at the encircled 8 and 9), and provide packet metrics generated by the monitoring actions to the network management and control system 115 (e.g., at the encircled 8' and 9'). The packets are then delivered to the destination VM 140, and the network management and control system 115 aggregates the received packet metrics (e.g., at the encircled 10). Additional details of the packet processing pipeline will be discussed further below.

Returning to the process 200, the process eventually receives (at 230) a control message from the network management and control system indicating the live traffic monitoring session should be terminated. In some embodiments, this control message is triggered by a timer set for the live traffic monitoring session upon initiation. In other embodiments, the control message is triggered in response to a user manually terminating the live traffic monitoring session. In response to the received control message, the process removes (at 240) the filtering stage from the packet processing pipeline in order to terminate the live traffic monitoring session. In some embodiments, rather than receiving a control message, the process terminates the live traffic monitoring session based on a certain number of packets having been tagged (i.e., an amount specified in the instructions initiating the monitoring session). The process 200 then ends.

Figure 3:
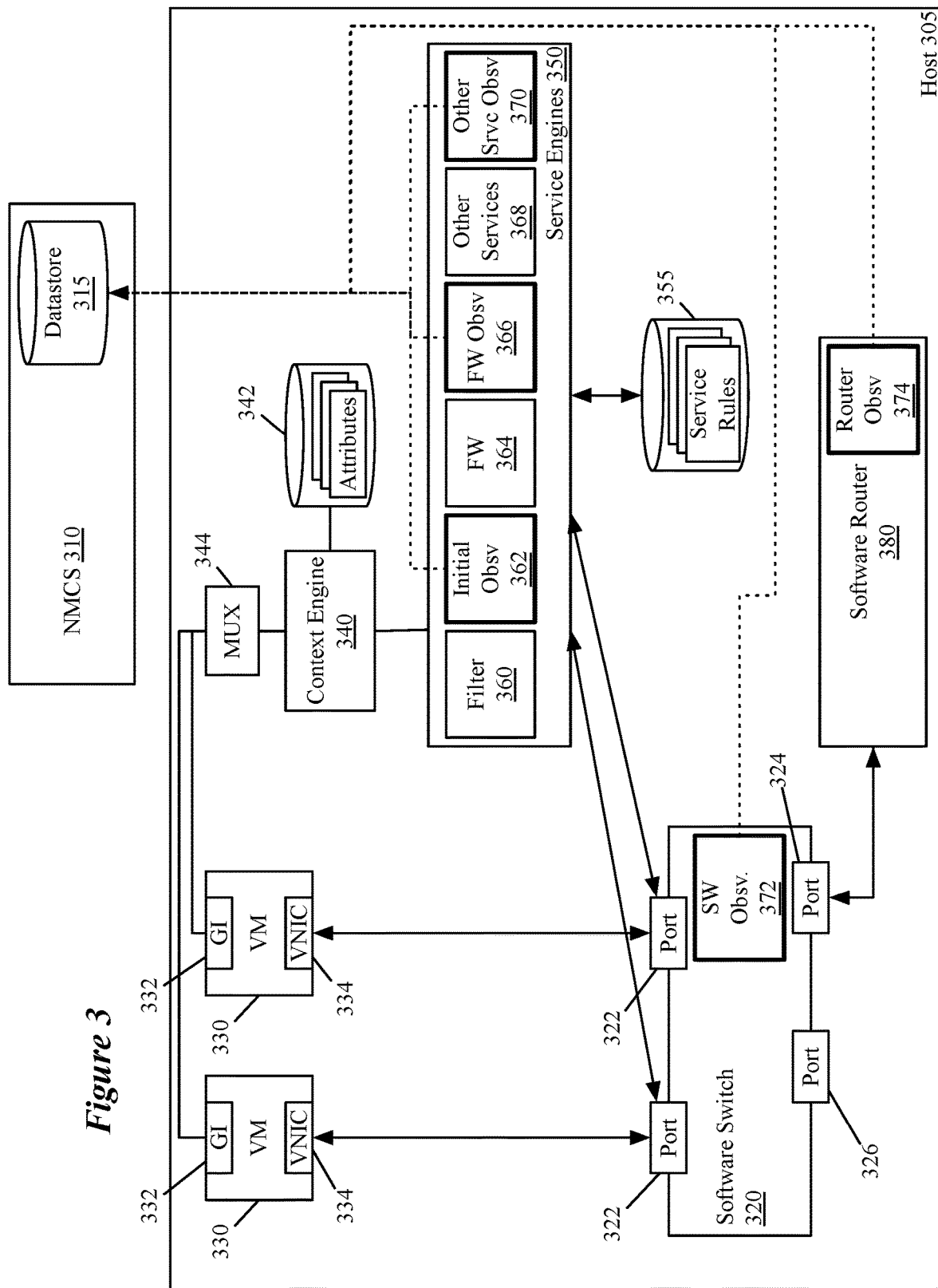
FIG. 3 illustrates a packet processing pipeline of a host computer, in some embodiments.

FIG. 3 illustrates a packet processing pipeline of a host computer of some embodiments. The host computer 305 includes a software switch 320, a software router 380, VMs 330, a context engine 340, an attributes storage 342, a MUX (multiplexer) 344, service engines 350, and a service rules storage 355. The software switch 320 includes ports 322 for connecting to the VMs 330, a port 324 for connecting to a software router 380, and a port 326 for connecting to a physical network interface card (PNIC) (not shown) of the host computer 305. In some embodiments, the context engine 340, the software switch 320, the software router 380, the service engines 350, the service rules storage 355, and the MUX 344 operate in the kernel space of a hypervisor, while the VMs 330 operate in the user space of the hypervisor. In other embodiments, one or more service engines are user space modules (e.g., are service VMs).

The VMs 330, in some embodiments, serve as data endpoints in a datacenter. While illustrated as VMs in this example, the VMs 330 in other embodiments are machines such as webservers, application servers, database servers, etc. In some embodiments, all of the VMs belong to one entity (e.g., an enterprise that operates on the host computer 305), while in other embodiments, the host computer 305 operates in a multi-tenant environment (e.g., in a multi-tenant datacenter), and different VMs 330 may belong to one tenant or to multiple tenants. In addition, as mentioned above, in some embodiments at least some of these endpoint machines may be containers or other types of data compute nodes rather than VMs.

Each of the VMs 330 includes a GI agent 332 that interacts with the context engine 340 to provide contextual attribute sets to this engine and to receive instructions and queries from this engine. Each GI agent 332, in some embodiments, registers with notification services of its respective endpoint machine to receive notifications regarding newly launched processes and/or previously launched processes on their endpoint machines, and/or regarding new message flows sent by or received for their endpoint machine. As shown, all communications between the context engine 340 and the GI agents 332 are relayed through the MUX 344, in some embodiments. An example of such a MUX is the MUX that is used by the Endpoint Security (EPSec) platform of ESX hypervisors of VMware, Inc.

In some embodiments, the GI agents 332 communicate with the MUX 344 through a fast communication channel (e.g., a virtual machine communications interface channel). This communication channel, in some embodiments, is a shared memory channel. In some embodiments, the attributes collected by the context engine 340 from the GI agents 332 include a rich group of parameters (e.g., layer 7 parameters, process identifiers, user identifiers, group identifiers, process name, process hash, loaded module identifiers, consumption parameters, etc.).

In addition to the GI agents 332, each VM 330 includes a virtual network interface card (VNIC) 334, in some embodiments. Each VNIC is responsible for exchanging packets between its VM and the software switch 320 and connects to a particular port 322 of the software switch. In some embodiments, the software switch 320 maintains a single port 322 for each VNIC of each VM. As mentioned above, the software switch 320 also includes a port 324 that connects to the software router 380, and a port 326 that connects to a PMC (not shown) of the host computer 305. In some embodiments, the VNICs are software abstractions of one or more PNICs of the host computer that are created by the hypervisor.

The software switch 320 connects to the host PNIC (through a network interface card (NIC) driver (not shown)) to send outgoing packets and to receive incoming packets. In some embodiments, the software switch 320 is defined to include a port 326 that connects to the PNIC's driver to send and receive packets to and from the PNIC. The software switch 320 performs packet-processing operations to forward packets that it receives on one of its ports to another one of its ports. For example, in some embodiments, the software switch 320 tries to use data in the packet (e.g., data in the packet header) to match a packet to flow-based rules, and upon finding a match, to perform the action specified by the matching rule (e.g., to hand the message to one of its ports 322, 324, or 326, which directs the packet to be supplied to a destination VM, the software router, or the PNIC).

The software router 380, in some embodiments, is a local instantiation of a distributed virtual router (DVR) that operates across multiple different host machines and can perform layer 3 (L3) packet forwarding between VMs on a same host or on different hosts. In some embodiments, a host computer may have multiple software routers connected to a single software switch (e.g., software switch 320), where each software router implements a different DVR.

The software router 380, in some embodiments, includes one or more logical interfaces (LIFs) (not shown) that each serves as an interface to a particular segment (virtual switch) of the network. In some embodiments, each LIF is addressable by its own IP address and serves as a default gateway or ARP proxy for network nodes (e.g., VMs) of its particular segment of the network. All of the different software routers on different host computers, in some embodiments, are addressable by the same "virtual" MAC address, while each software router is also assigned a "physical" MAC address in order to indicate on which host computer the software router operates.

In some embodiments, the software switch 320 and the software router 380 are a combined software switch/router. The software switch 320 in some embodiments implements one or more logical forwarding elements (e.g., logical switches or logical routers) with software switches executing on other host computers in a multi-host environment. A logical forwarding element, in some embodiments, can span multiple hosts to connect VMs that execute on different hosts but belong to one logical network.

Different logical forwarding elements can be defined to specify different logical networks for different users, and each logical forwarding element can be defined by multiple software forwarding elements on multiple hosts. Each logical forwarding element isolates the traffic of the VMs of one logical network from the VMs of another logical network that is serviced by another logical forwarding element. A logical forwarding element can connect VMs executing on the same host and/or on different hosts. In some embodiments, the software switch 320 extracts from a packet a logical network identifier (e.g., a VNI) and a MAC address. The software switch in these embodiments uses the extracted VNI to identify a logical port group, and then uses the MAC address to identify a port within the identified port group.

Software switches and software routers (e.g., software switches and software routers of hypervisors) are sometimes referred to as virtual switches and virtual routers because they operate in software. However, in this document, software switches may be referred to as physical switches because they are items in the physical world. This terminology also differentiates software switches/routers from logical switches/routers, which are abstractions of the types of connections that are provided by the software switches/routers. There are various mechanisms for creating logical switches/routers from software switches/routers. VXLAN provides one manner for creating such logical switches. The VXLAN standard is described in Mahalingam, Mallik; Dutt, Dinesh G.; et al. (2013-05-08), VXLAN: A Framework for Overlaying Virtualized Layer 2 Networks over Layer 3 Networks, IETF.

In some embodiments, the ports of the software switch 320 include one or more function calls to one or more modules that implement special input/output (I/O) operations on incoming and outgoing packets that are received at the ports. Examples of I/O operations that are implemented by the ports 322 include ARP broadcast suppression operations and DHCP broadcast suppression operations, as described in U.S. Pat. No. 9,548,965. Moreover, the operation of the context engine 340 as well as the GI agents 332 for some embodiments is further described in U.S. Pat. No. 10,802,857, which is incorporated herein by reference.

Other I/O operations (e.g., firewall operations, load-balancing operations, network address translation (NAT) operations, traffic monitoring operations, etc.) can also be implemented. For example, the service engines 350 include a filtering stage 360 for tagging packets of interest for live traffic monitoring sessions, an initial observation stage 362, a firewall stage 364, a firewall observation stage 366, other services stage 368, and other service observation stage 370. By implementing a stack of such function calls, the ports can implement a chain of I/O operations on incoming and/or outgoing packets, in some embodiments. For example, the source host computer 105 and destination host computer 110 described above include such I/O operations for incoming and outgoing packets.

In addition to the function call observation operations of the service engines 350, other modules in the datapath implement observation operations as well. For example, the software switch 320 includes a switching observation stage 372 and the software router 380 includes a router observation stage 374. Together, these stages, along with an encapsulation stage (not shown), make up the packet processing pipeline of the host computer 305. The initial observation stage 362, firewall observation stage 366, other services observation stage 370, switching observation stage 372, and router observation stage 374 all provide metrics generated by monitoring actions executed on packets to the datastore 315 of the network management and control system 310, as illustrated by the dashed lines leading from these stages to the datastore 315.

In some embodiments, one or more function calls of the software switch ports 322 can be to one or more service engines 350 that process service rules in the service rules storage 355 and that perform monitoring actions for live traffic monitoring sessions. While illustrated as sharing one service rules storage 355, in some embodiments, each service engine 350 has its own service rules storage 355. Also, in some embodiments, each VM 330 has its own instance of each service engine 350, while in other embodiments, one service engine can service packet flows for multiple VMs on a host (e.g., VMs for the same logical network).

To perform its configured service operation(s) for a packet flow, a service engine 350 in some embodiments tries to match the flow identifier (e.g., five-tuple identifier) and/or the flow's associated contextual attribute set to the match attributes of its service rules in the service rules storage 355. Specifically, for a service engine 350 to perform its service check operation for a packet flow, the software switch port 322 that calls the service engine supplies a set of attributes of a packet that the port receives. In some embodiments, the set of attributes are packet identifiers, such as traditional five-tuple identifiers. In some embodiments, one or more of the identifier values can be logical values that are defined for a logical network (e.g., can be IP addresses defined in a logical address space). In other embodiments, all of the identifier values are defined in the physical domains. In still other embodiments, some of the identifier values are defined in the logical domain, while other identifier values are defined in the physical domain.

A service engine, in some embodiments, then uses the received packet's attribute set (e.g., five-tuple identifier) to identify a contextual attribute set for the flow. In some embodiments, the context engine 340 supplies the contextual attributes for new flows (i.e., new network connection events) sent or received by the VMs 330, and for new processes executing on the VMs 330, to the service engines 350, along with a flow identifier or process identifier. In some embodiments, the service engines 350 pull the contextual attribute sets for a new flow or new process from the context engine. For instance, in some embodiments, a service engine supplies a new flow's five-tuple identifier that it receives from the software switch port 322 to the context engine 340, which then examines its attributes storage 342 to identify a set of attributes that is stored for this five-tuple identifier, and then supplies this attribute set (or a subset of it that it obtains by filtering the identified attribute set for the service engine) to the service engine.

After identifying the contextual attribute set for a data message flow or process, the service engine 350, in some embodiments, performs its service operation based on service rules stored in the service rules storage 355. To perform its service operation, the service engine 350 compares the received attribute set with the match attribute sets of the service rules to attempt to find a service rule with a match attribute set that matches the received attribute set.

The match attributes of a service rule, in some embodiments, can be defined in terms of one or more layer 2 (L2) through layer 4 (L4) header parameters, as well as contextual attributes that are not L2-L4 header parameters (e.g., are layer 7 (L7) parameters, process identifiers, user identifiers, group identifiers, process name, process hash, loaded module identifiers, consumption parameters, etc.). Also, in some embodiments, one or more parameters in a rule identifier can be specified in terms of an individual value or a wildcard value. In some embodiments, a match attribute set of a service rule can include a set of individual values or a group identifier, such as a security group identifier, a compute construct identifier, a network construct identifier, etc.

In some embodiments, to match a received attribute set with the rules, the service engine compares the received attribute set with the associated match attribute sets of the service rules stored in the service rules storage 355. Upon identifying a matching rule, the service engine 350 performs a configured service operation (e.g., a firewall operation), based on the action parameter set (e.g., based on Allow/Drop parameters) of the matching rule. The service rules storage 355, in some embodiments, is defined in a hierarchical manner to ensure that a packet rule check will match a higher priority rule before matching a lower priority rule, when the packet's attribute subset matches multiple rules. In some embodiments, the context-based service rule storage 355 includes a default rule that specifies a default action for any packet rule check that cannot identify any other service rules. Such a default rule will be a match for all possible attribute subsets, in some embodiments, and ensures that the service engine will return an action for all received attribute sets. In some embodiments, the default rule will specify no service.

For packets having the same packet identifier attribute sets (e.g., packets belonging to the same flow), the service engine of some embodiments stores any service rules matching the attribute sets in a connection state cache storage (not shown) for later use on subsequent packets of the same packet flow. This connection state cache storage, in some embodiments, stores the service rule, or a reference to the service rule. In some embodiments, the rule or reference to the rule is stored with an identifier (e.g., the flow's five-tuple identifier and/or a hash value of the same) that is generated from the matching packet identifier set. In some embodiments, a service engine 350 checks this connection state cache storage before checking the service rule storage 355 in order to determine if any service rules have been identified for packets belonging to the same flow. If not, the service engine checks the rules storage 355.

In some embodiments, the other services 368 service engine includes a deep packet inspection (DPI) for performing DPI on packets to identify a traffic type (i.e., the application on the wire) that is being sent in this packet flow, generates an AppID for this traffic type, and stores the AppID in the attributes storage 342. In some embodiments, the AppID is stored in the attributes storage 342 based on that flow's five-tuple identifier.

In addition to the configured operations of the service engines 350, some stages of the I/O chain perform monitoring actions on packets tagged by the filtering stage 360 as part of a live traffic monitoring session. To identify which monitoring actions are specified for a packet, in some embodiments, a stage reads the set of monitoring actions to be performed from the packet's metadata stored at the computing device. Additional details regarding FIG. 3 and the live traffic monitoring sessions will be further described below with reference to FIG. 4.

Figure 4:
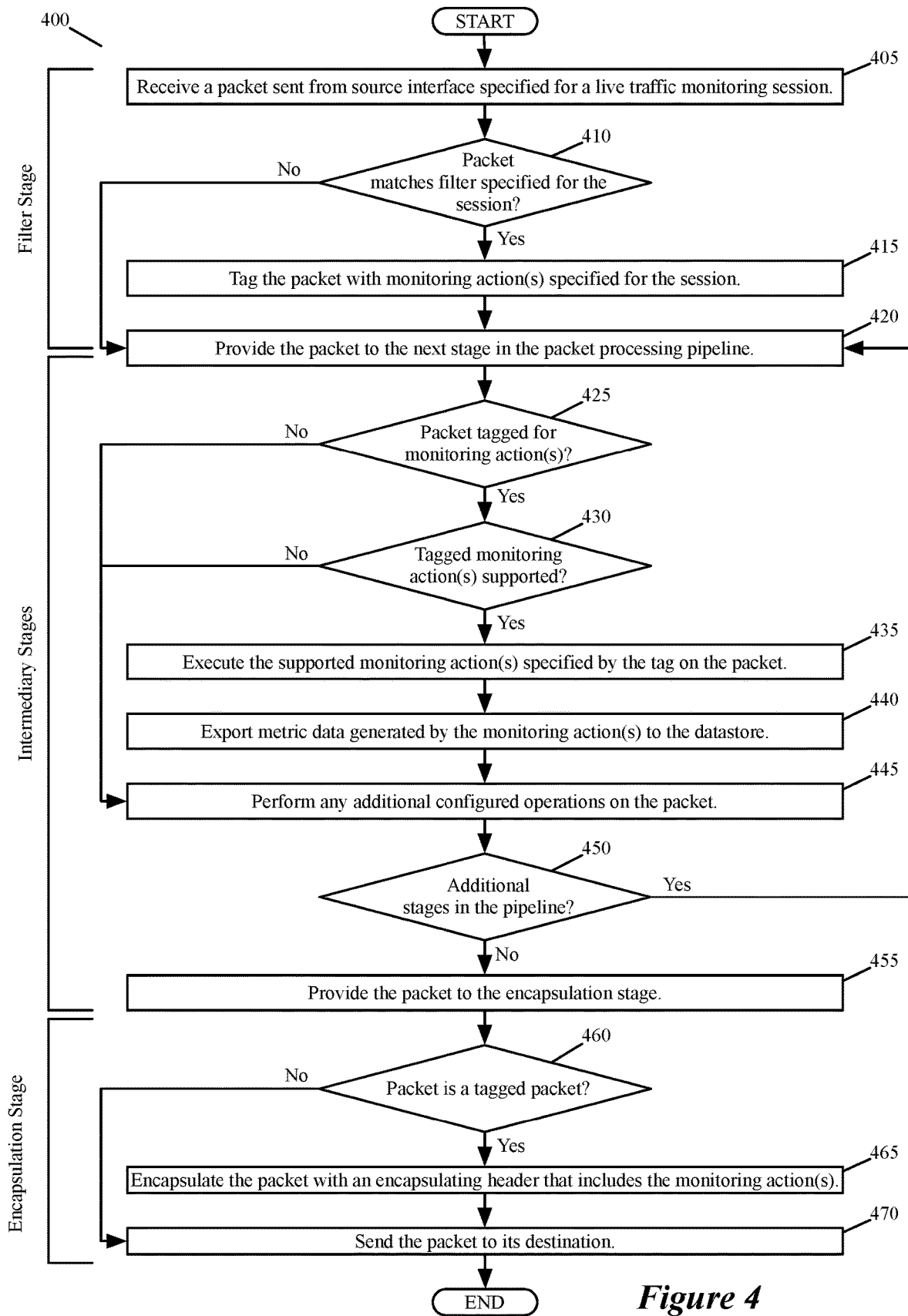
FIG. 4 illustrates a process performed by a packet processing pipeline on a source host computer to process packets for a live traffic monitoring session, in some embodiments.

FIG. 4 conceptually illustrates a process 400 of some embodiments for processing packets for a live traffic monitoring session. In some embodiments, the process 400 is performed by a packet processing pipeline on a source host computer (e.g., by various components executing on the source host computer, including various service engines, software forwarding elements, etc.).

As shown, the process 400 starts by receiving (at 405) a packet sent from a source interface specified for a live traffic monitoring session. For instance, when a VM 330 sends a packet, a port 322 of the software switch 320 provides the packet to the service engines 350 for processing, starting with the filtering stage 360. In some embodiments, some of the ports are specified for live traffic monitoring while other ports do not have any traffic monitoring specified.

The process determines (at 410) whether the packet matches the filter specified for the live traffic monitoring session. As described above, the filtering stage matches packets against a filter specified for the particular interface from which the packet is received. In some embodiments, the particular filter can define a packet flow or set of packet flows. For instance, in some embodiments, the filter is a five-tuple identifier (e.g., source and destination addresses, source and destination ports, and protocol) for a packet flow. A packet flow defined by the particular filter, in some embodiments, can be a bidirectional packet flow, in which case the filtering stage is implemented at both the source computing device and the destination computing device (to tag return traffic). Live traffic monitoring for bidirectional flows will be discussed in more detail below with reference to FIG. 9.

When the process determines (at 410) that the packet does not match the filter, the process transitions to provide the packet (at 420) to the next stage in the packet processing pipeline. Otherwise, when the process determines (at 410) that the packet does match the filter, the process tags (at 415) the packet with any monitoring actions specified for the session. In some embodiments, to tag the packet with the monitoring actions, the filtering stage writes identifiers for the monitoring actions into the metadata of the packet (e.g., as an attribute of the packet). The packet is stored in memory during processing by the various components (service engines, software switches and/or routers, etc.) of the virtualization software of the host computer in some embodiments, and the filtering stage writes the identifiers for the specified monitoring actions into this memory as packet metadata.

The process then provides (at 420) the packet to the next stage in the packet processing pipeline. For instance, on the host computer 305, the filtering stage 360 provides the packet to the initial observation stage 362. Other embodiments may have a different stage, such as a stage that does not perform any monitoring actions for the live monitoring session, as the next stage in the packet processing pipeline.

In addition, while FIG. 3 shows the observation stages as separate stages from the firewall stage, switching stage, etc., it should be understood that in some embodiments these observation stages are actually executed as part of their underlying stage (e.g., as part of the firewall stage, switching stage, etc.).

At the next packet processing stage, the process determines (at 425) whether the packet is tagged for monitoring actions. In some embodiments, to identify which monitoring actions are specified for a packet, a stage reads the set of monitoring actions to be performed from the packet's metadata stored at the computing device. In different embodiments, the packet's tag specifies either a general set of monitoring actions to be executed on the packet or specific monitoring actions for specific stages to execute. If the process determines (at 425) that the packet is not tagged for any monitoring actions, the process transitions to perform (at 445) any additional operations configured for that stage on the packet.

Otherwise, when the process 400 determines (at 425) that the packet is tagged for monitoring actions, the process determines (at 430) whether any of the tagged monitoring actions are supported by the packet processing stage. In some embodiments, one stage may support a particular monitoring action that is not supported by other stages in the packet processing pipeline, while other monitoring actions are supported by multiple stages that each perform those monitoring actions on packets for which the actions are specified. In some embodiments, a subset of stages in the packet processing pipeline do not support any monitoring actions and only process packets according to configuration data for the stage.

If none of the tagged monitoring actions are supported by the stage, the process 400 transitions to perform (at 445) any additional operations configured for that stage on the packet. Otherwise, when the process determines (at 430) that at least one tagged monitoring action is supported by the stage, the process executes (at 435) any supported monitoring actions specified by the tag on the packet. In some embodiments, the monitoring actions specified for a packet are specified in a priority order. For a stage that supports at least two monitoring actions to be performed on the packet, in some embodiments, the stage executes the at least two monitoring actions on the received packet in the specified priority order (i.e., with higher priority actions executed prior to lower priority actions by the packet processing stage). If a first higher-priority monitoring action modifies the packet, then a second lower-priority monitoring action is executed on the modified packet.

The process 400 then exports (at 440) metric data generated by each executed monitoring action to a centralized data repository (e.g., a datastore at the network controller and/or network manager). On the host computer 305, for example, each of the observation stages 362, 366, 370, 372, and 374 are illustrated with dotted lines leading to the datastore 315 of the network management and control system 310 to indicate these stages provide the metrics to the datastore. This export process is described further below.

Next, the process 400 performs (at 445) any additional operations configured for the stage on the packet. While illustrated as separate stages, the firewall stage 364 and the firewall observation stage 366 (as well as other pairs of packet processing stage and corresponding observation stage), in some embodiments, are one stage that performs both monitoring actions and other firewall operations (e.g., filtering traffic based on source or destination information).

The process 400 determines (at 450) whether there are additional intermediary stages in the pipeline to process the packet. When additional intermediary stages remain in the packet processing pipeline, the process 400 provides the packet (at 420) to the next stage in the packet processing pipeline. For instance, once the other services observation stage 370 on the host computer 305 processes a packet, it provides the packet back to a port 322 of the software switch 320 where the switching observation stage 372 processes the packet.

Otherwise, once all of the intermediary stages in the packet processing pipeline have been completed, the process 400 provides (at 455) the packet to the encapsulation stage. If the switching observation stage 372 is the last intermediary stage in the pipeline on the host computer 305, for example, the switching observation stage 372 would provide the packet to the encapsulation stage (not shown).

At the encapsulation stage, the process determines (at 460) whether the packet is a tagged packet. Like the intermediary stages, the encapsulation stage, in some embodiments, determines whether the packet is tagged in order to determine how to process the packet. When the packet is not tagged with any packet monitoring actions, the process encapsulates the packet and sends the packet (at 470) to its destination.

Otherwise, when the packet is tagged with identifiers for one or more packet monitoring actions, the process encapsulates (at 465) the packet with an encapsulating header that includes the monitoring actions specified by the tag. In some embodiments, the encapsulation stage encapsulates the packet with a Geneve header or an in-band network telemetry (INT) header that includes data specifying the monitoring actions. By encapsulating packets with encapsulation headers that specify the monitoring actions, the encapsulation stage enables other computing devices that process the packet (e.g., edge devices, destination devices) to perform the monitoring actions on the packet and to generate additional metrics associated with the packet and the live packet monitoring session.

Figure 5:
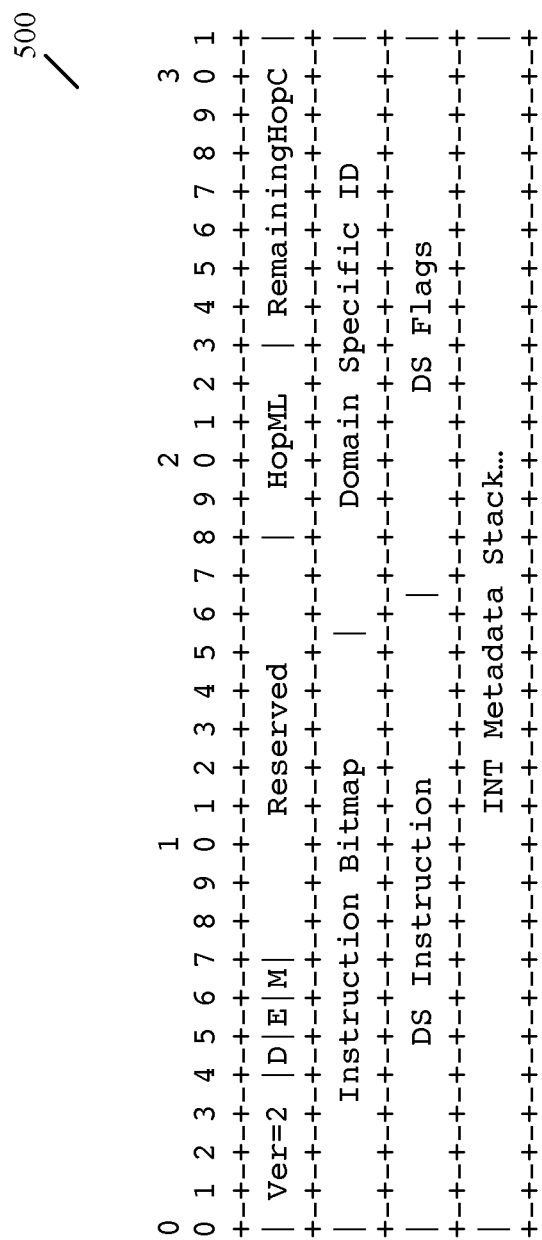
FIG. 5 illustrates an example header for a packet that includes metadata specifying the monitoring actions for a live traffic monitoring session, in some embodiments.

FIG. 5 illustrates an example header 500 of some embodiments for a packet that includes the metadata specifying the monitoring actions. The Ver field for the header 500 is set to 2 to indicate the current implementation is based on INT 2.0, the D bit is set to 0 to indicate INT sink should not drop packets with live traffic monitoring session metadata, and HopML is 0 because the INT header populated by session only includes live traffic monitoring session-specific instructions, which do not write data into INT metadata stack. Additionally, the desired monitoring actions are encoded into live traffic monitoring session-specific instructions stored in a domain-specific instruction bitmap (i.e., DS Instruction) identified by a domain-specific ID, with each non-auxiliary action having a unique bit allocated to it.

Returning to process 400, the process then sends the packet (at 470) to its destination (e.g., a destination network address specified in the encapsulation header). These destinations may include gateway devices between a logical network and an external network, a destination device that hosts a destination endpoint machine for the packet, etc.

Figure 6:
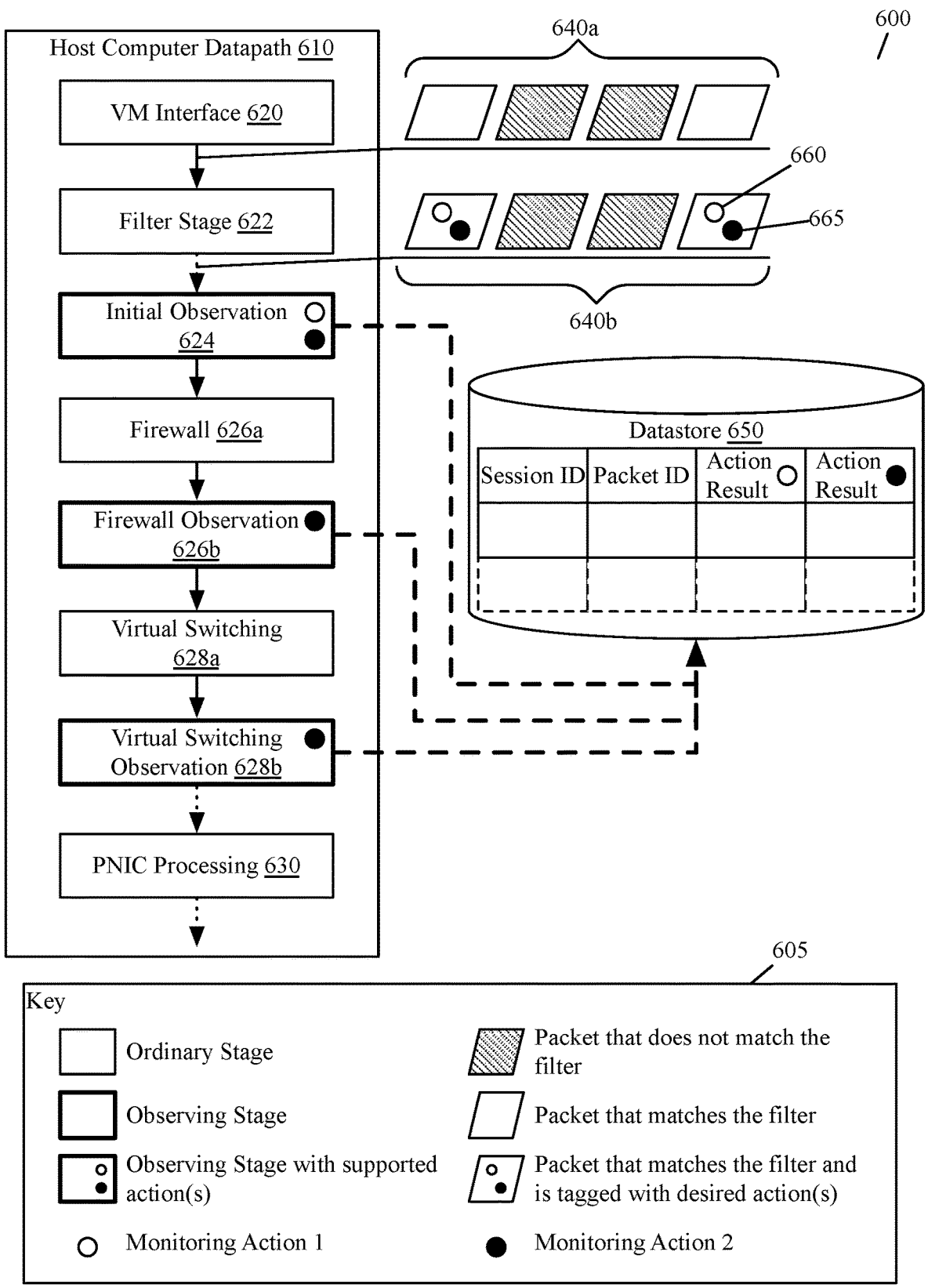
FIG. 6 illustrates a diagram depicting a more detailed example of a packet processing pipeline that performs live traffic monitoring sessions, in some embodiments.

FIG. 6 illustrates a more detailed example of a packet processing pipeline that performs live traffic monitoring sessions, in some embodiments. This figure shows a host computer datapath 610, a datastore 650, and a legend 605. The datastore 650, in some embodiments, is part of a network management and control system (e.g., the network management and control system 310 described above). For instance, the datastore 650 might be located on a network controller or network manager in some embodiments, while in other embodiments the datastore 650 is located in a separate virtual appliance or a physical server.

The host computer datapath 610 includes a VM interface 620 from which packets of interest are sent, a filtering stage 622, an initial observation stage 624, a firewall stage 626a, a firewall observation stage 626b, a virtual switching stage 628a, a virtual switching observation stage 628b, and a PNIC processing stage 630. Different embodiments may include different stages than those illustrated (e.g., additional stages, fewer stages, other stages). As indicated by the legend 605, the VM interface 620, filter stage 622, firewall stage 626a, virtual switching stage 628a, and PNIC processing 630 are all ordinary stages in the datapath 610 because these stages do not support monitoring actions. Conversely, the initial observation stage 624, firewall observation stage 626b, and virtual switching observation stage 628b are each represented with a different (i.e., bold) outline, indicating that these stages are observing stages as denoted by the legend 605.

In addition to the different outline, the observing stages 626b and 628b include a solid circle indicating these stages support monitoring action 2, while stage 624 includes a hollow circle and a solid circle indicating this stage supports both monitoring action 1 and monitoring action 2. As described above, the monitoring actions can include packet tracing, packet capturing, packet counting, and/or other monitoring actions, in some embodiments.

As described above, the filtering stage 622 is responsible for identifying packets that match a filter (e.g., flow identifier(s)), and tagging these identified packets with monitoring actions to be performed on the packets. The set of packets 640a represents packets that have not yet been processed by the filtering stage 622. The packets 640a include two packets that do not match the filter, and two packets that do match the filter, as indicated by the legend 605. Accordingly, the two matching packets in the set of packets 640b, which represent the packets after they have been processed by the filtering stage 622, each include a hollow circle and a solid circle indicating these packets are tagged for monitoring action 1 and monitoring action 2.

In some embodiments, the monitoring actions specified for a live traffic monitoring session are listed in the user request in order of priority (e.g., in a hierarchical API command). In some such embodiments, the filtering stage 622 tags the packets with the monitoring actions in that same priority order so that each observation stage that processes the packets performs the monitoring actions in the priority order in which they are listed (i.e., with higher priority actions executed prior to lower priority actions by the packet processing stage). If a first higher-priority monitoring action modifies the packet, then a second lower-priority monitoring action is executed on the modified packet. For instance, the initial observation stage 624 supports both monitoring action 1 and monitoring action 2, and may then perform these monitoring actions in order (i.e., monitoring action 1 then monitoring action 2).

As the stages perform monitoring actions on packets, the packet metrics generated by the monitoring actions automatically populate the datastore 650, as indicated by the dashed lines leading from the observation stages 624, 626b, and 628b to the datastore 650. The packet metrics, in some embodiments, include a session identifier for the live traffic monitoring session, a packet identifier for the packet, and action results for each action performed. The session identifier and packet identifier are used, in some embodiments, to aggregate the metrics and response to queries at different levels of granularity (e.g., at the individual packet level, and at the session level).

Figure 7:
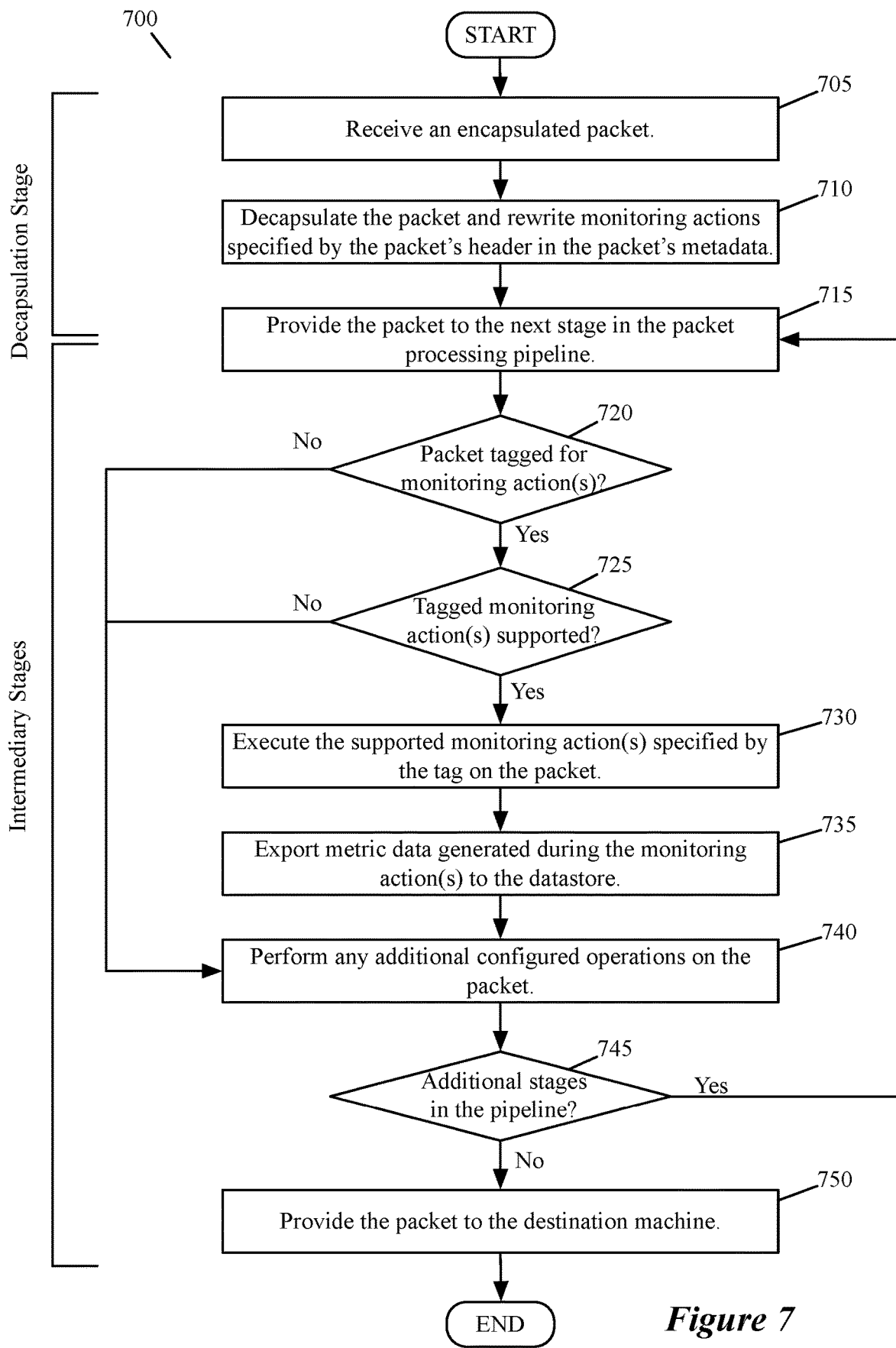
FIG. 7 illustrates a process performed for a live traffic monitoring session by a packet processing pipeline executed by a destination computing device, in some embodiments.

As mentioned above, including the monitoring action information in a packet's encapsulation header enables other computing devices that process the packet to perform these monitoring actions as well. FIG. 7 conceptually illustrates a process 700 of some embodiments for processing packets for a live traffic monitoring session at a destination computing device. Like the process 400 shown in FIG. 4, in some embodiments the process 400 is performed by a packet processing pipeline on a destination host computer (e.g., by various components executing on the source host computer, including various service engines, software forwarding elements, etc.).

The process 700 starts by receiving (at 705) an encapsulated packet. The packet is received, in some embodiments, by a decapsulation stage of the destination computing device's packet processing pipeline. The process decapsulates (at 710) the packet and rewrites any monitoring actions specified by the packet's header into the packet's metadata. For instance, the decapsulation stage would rewrite the live traffic monitoring session-specific instructions stored in the domain-specific instruction bitmap (i.e., DS Instruction) identified by the domain-specific ID of the packet header 500 into the packet's metadata as stored at the host computing device.

The process then provides (at 715) the packet to the next stage in the packet processing pipeline. As described for the process 400, the next stage, in some embodiments, is an intermediary stage between the decapsulation stage and a destination interface of the packet. For example, on the destination host computer 110, the decapsulation stage 146 provides packets to the switching observation stage 144.

At the next stage, the process determines (at 720) whether the packet is tagged for any monitoring actions. The intermediary stages, in some embodiments, identify which monitoring actions are specified for a packet by reading the set of monitoring actions to be performed from the packet's metadata stored at the computing device. In different embodiments, either a general set of monitoring actions to be executed on the packet or specific monitoring actions for specific stages to execute may be specified by the packet's tag.

When the packet is not tagged for any monitoring actions, the process 700 performs (at 740) any additional operations configured for the stage on the packet. For instance, a packet processing pipeline may include a deep packet inspection (DPI) engine for performing DPI on packets to determine an AppID (i.e., traffic type) associated with the packet. Unlike the metric data generated by the monitoring actions, data generated by any other operations configured for a stage is not provided to the datastore that stores the monitoring action metric data, according to some embodiments.

Otherwise, if the packet is tagged for monitoring actions, the process 700 determines (at 725) whether any of the tagged monitoring actions are supported by the stage. If none of the tagged monitoring actions are supported by the stage, the process 700 performs (at 740) any additional operations configured for the stage on the packet.

Otherwise, when at least one tagged monitoring action is supported by the stage, the process execute (at 730) the supported monitoring actions specified by the tag on the packet. When at least two monitoring actions are specified for a packet in a priority order, in some embodiments, the stage performs the actions in that priority order. In some embodiments, this is to ensure that monitoring actions meant to be performed on the original packet are not instead performed on a modified packet (i.e., when a first monitoring action performed modifies the packet).

The process exports (at 735) metric data generated by the monitoring actions to a centralized data repository (e.g., a datastore at the network controller and/or network manager), and performs (at 740) any additional operations configured for the stage on the packet. The process then determines (at 745) whether there are any additional intermediary stages in the packet processing pipeline. When additional intermediary stages in the packet processing pipeline remain, the process returns to 715 to provide the packet to the next stage in the pipeline. For instance, the switching observation stage 144 of the destination host computer 110 would provide the packet to the firewall observation stage 142.

Otherwise, once all of the intermediary stages in the pipeline have been executed, the process provides (at 750) the packet to the destination machine. After processing the packet, the firewall stage 142 of the destination host computer 110 provides the packet to the VM 140, for example. Following 750, the process 700 ends.

Figure 8:
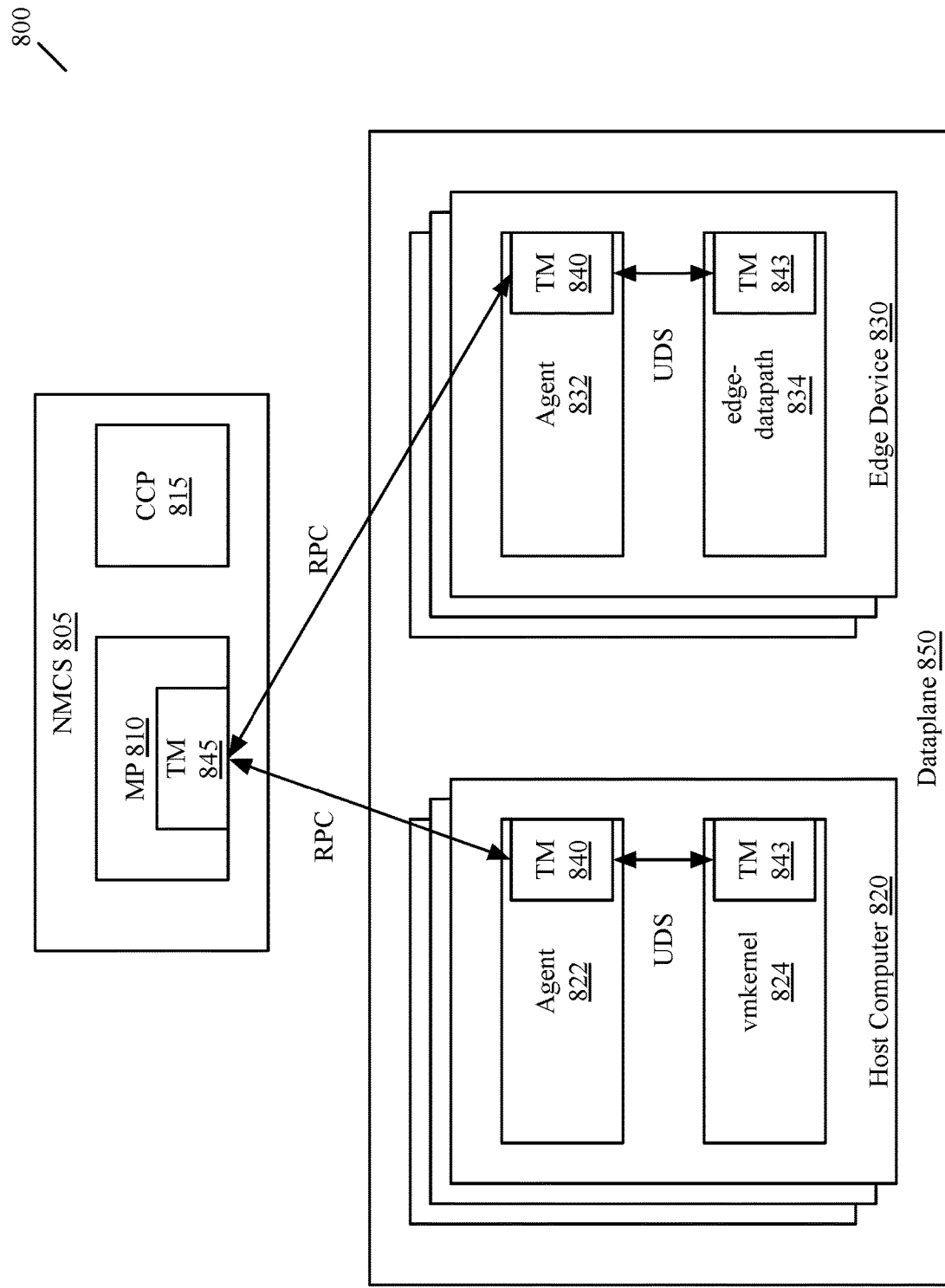
FIG. 8 illustrates an example network architecture in which a live traffic monitoring system is implemented, in some embodiments.

The embodiments above describe packets sent from one host computer to another host computer. However, live packet monitoring sessions can also be used for packets sent to different edge devices, in some embodiments, as well as packets that traverse edge devices en route to their destinations. FIG. 8 illustrates an example network architecture 800 of some embodiments in which a live traffic monitoring system is implemented.

The architecture 800 includes a network management and control system 805 and a dataplane 850. As illustrated, the dataplane 850 includes host computers 820 and edge devices 830 (e.g., in one or more datacenters), while the network management and control system 805 includes a management plane 810 and a central control plane 815. The management plane 810 provides an API entry point (e.g., for receiving live traffic monitoring requests) and persists user configuration data. The central control plane 815 of some embodiments computes stateless configurations based on user configuration data from the management plane 810 and runtime states from the dataplane (e.g., from the host computers 820 and edge devices 830) and provides this configuration to the host computers 820 and edge devices 830. The live traffic monitoring system is represented on the network management and control system 805 by the traffic monitoring module 845 of the management plane 810.

As shown, each of the host computers 820 includes an agent 822 and a vmkernel 824 (e.g., the packet processing pipeline), while each of the edge devices 830 includes an agent 832 and an edge0datapath 834 (which executes a packet processing pipeline on the edge device 830). In some embodiments, the traffic monitoring modules 840 in the agents 822 and 832 receive live traffic monitoring requests from the management plane traffic monitoring module 845 and configure the filtering and/or observation stages 843 in the vmkernels 824 and edge-datapaths 834.

In some embodiments, the filtering stages 843 implemented in a vmkernel 824 and/or edge-datapath 834 tags packets that match the filter by storing monitoring actions as packet attributes. In some embodiments, the vmkernels 824 and edge-datapaths 834 also implement the observing stages (e.g., the initial observation stage 624, firewall observation 626b, and virtual switching observation 628b).

In some embodiments, intra-dataplane communication between the traffic monitoring modules 840 and 843 is based on Unix Domain Socket (UDS), while communication between the network management and control system's traffic monitoring module 845 and the dataplane traffic monitoring modules 840 is based on remote procedure call (RPC). The traffic monitoring modules 840 use RPC, for instance, to report metric data generated by monitoring actions performed on packets to the network management and control system 805.

The live traffic monitoring sessions, in some embodiments, can be specified for packets sent northbound (i.e., from a host computer 820, out of the network) and southbound. In some embodiments, as mentioned above, edge devices can be intermediate devices between two host computers (i.e., depending on the logical network) such that a source host computer, an edge device, and a destination host computer would all be providing metric data to the network management and control system 805. Also, in some embodiments, an edge device may be specified in a live traffic monitoring request as the source computing device and/or destination computing device for packets of interest.

In some embodiments, when an edge device that is an intermediary device between a packet's source and destination receives a packet encapsulated with a header specifying monitoring actions, a decapsulation stage of the edge device's packet processing pipeline decapsulates the packet, rewrites the monitoring actions into the packet's metadata, and provides the decapsulated packet to the next stage in the edge device's pipeline. Once each stage of the pipeline has processed the packet and performed any supported monitoring actions on the packet, an encapsulation stage re-encapsulates the packet with an encapsulating header that specifies the monitoring actions (e.g., packet header 500), and sends the packet toward its destination, according to some embodiments.

Figure 9:
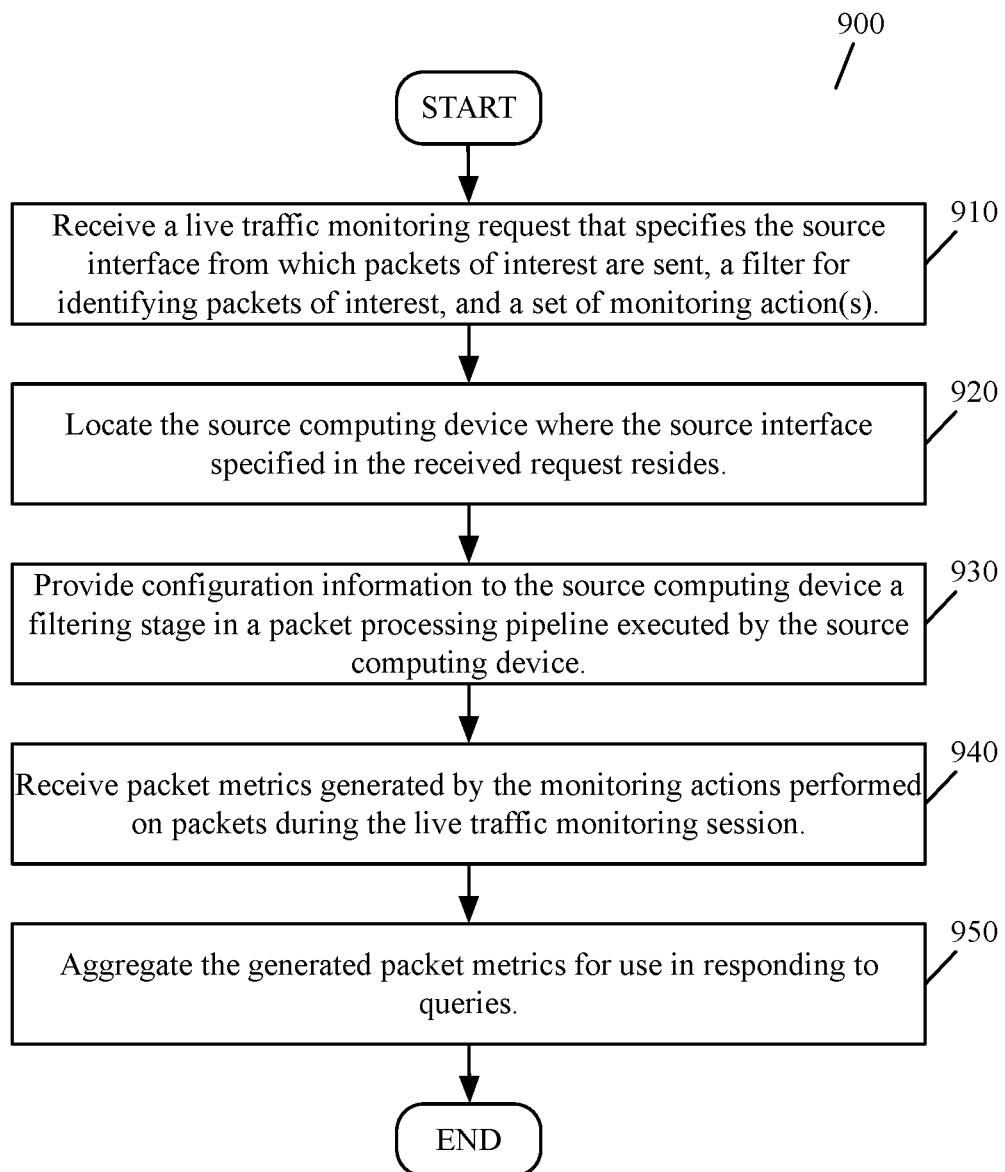
FIG. 9 illustrates a process performed by a network management and control system to initiate a live traffic monitoring session, in some embodiments.

FIG. 9 illustrates a process 900 of some embodiments for initiating a live traffic monitoring session. The process 900 is performed by one or more components of a network management and control system. In different embodiments, this may be the management plane (e.g., the traffic monitoring module of the management), central control plane, or a combination thereof.

As shown, the process 900 starts by receiving (at 910) a live traffic monitoring request that specifies the source interface (or source machine) from which packets of interest are sent, a filter for use in identifying packets of interest, and a set of monitoring actions to be performed on the packets of interest. This request, in some embodiments, is received from a user (e.g., administrator) as an API command via an API entry point provided by the network management and control system.

In some embodiments, the live traffic monitoring request also specifies a packet sampling setting. This packet sampling setting, in some embodiments, identifies whether all packets matching the filter should be tagged or only a subset. For instance, this might specify that only the first N packets matching the filter will be tagged (at least up to N packets, if the packet monitoring session ends prior to N being reached). The packet sampling setting could also specify that only every M packets matching the filter is tagged (e.g., every 5 packets, etc.) or that packets are checked against the filter per T (an amount of time), with matching packets being tagged.

The process locates (at 920) the computing device at which the source interface specified in the request is located. For example, the network management and control system 805 may locate any of the host computers 820 or edge devices 830 based on the source interface specified in a request. For edge devices, in some embodiments, a request may specify an uplink through which the edge device receives packets as a source interface for packets of interest. In some embodiments, if the live traffic monitoring session is specified for a bidirectional packet flow, the network management and control system identifies both the source and destination computing devices (because the destination computing device in one direction is the source device in the return direction).

The process 900 provides (at 930) configuration information to the source computing device in order to instruct the source computing device to install a filtering stage as the first stage in a packet processing pipeline executed by the source computing device. As described by the process 200 above, when the source computing device installs the filtering stage, the live traffic monitoring session is initiated. As a result, packets matching the filter are tagged by the filtering stage with monitoring actions to be performed on the tagged packets by subsequent packet processing stages.

When the live traffic monitoring session is performed for a bidirectional packet flow, the process provides the configuration information to both the source and destination computing devices, in some embodiments, so that the filtering stage is installed at both the source and destination computing devices. This enables return traffic from the destination computing device to the source computing device to be tagged with the monitoring actions as well.

The process 900 eventually receives (at 940) packet metrics generated as the monitoring actions are performed on the tagged packets during the live packet monitoring session. The network management and control system 115, for example, is illustrated as receiving packet metrics from each of the observing stages executed by the source and destination host computers 105 and 110. In some embodiments, a central data repository (e.g., a datastore) is automatically populated with the packet metrics as they are generated. This repository, in some embodiments, is a part of the network management and control system (e.g., stored at the management plane or control plane), while in other embodiments, the repository is located in a separate virtual appliance, or a physical server.

The process then aggregates (at 950) the generated packet metrics. In some embodiments, the network management and control system periodically aggregates generated packet metrics as the metrics are received, while in other embodiments, the network management and control system does not aggregate the metrics until the live traffic monitoring session is completed (i.e., terminated).

For instance, in some embodiments, the network management and control system aggregates the metrics after it has sent a control message to the computing device(s) at which the filtering stage is implemented to instruct the computing device(s) to remove the filtering stage from the pipeline. In some embodiments, the network management and control system sends the control message based on a timer for the live traffic monitoring session, while in other embodiments, a user manually triggers the termination of the live traffic monitoring session. After the generated packet metrics have been aggregated, the process 900 ends.

Figure 10:
FIG. 10 illustrates an example of packet metrics for two packets before and after aggregation, in some embodiments.

FIG. 10 illustrates an example of packet metrics for two packets before and after aggregation, in some embodiments. As illustrated by the table 1010 of collected packet metrics for packets 1 and 2, the packets belong to the same session identified by the session ID 5. The "FW" refers to a firewall component (e.g., firewall observation 626b), while the "OR" refers to an overlay routing component.

For packet 1, the table 1010 indicates the firewall component and overlay routing component each counted the packet one time. Additionally, the firewall component applied a rule resulting in the packet being allowed, as indicated by "action=allow" in the trace result column, while the overlay routing component identified the source and destination VNIs of the packet. For packet 2, only the firewall component provided a count result, indicating the packet was counted once. The trace results from the firewall component indicate that a rule was applied to packet 2, which resulted in packet 2 being dropped. The dropping of packet 2 by the firewall component could be an indication of why there are no metrics provided by the overlay routing component for packet 2 (i.e., because the packet was dropped before it could be processed by the overlay routing component).

In the post-aggregation table 1020, the metrics for the session as a whole, and for each packet are aggregated. For instance, the count results indicate 2 packets for the session were counted by the firewall component, and one packet for the session was counted by the overlay routing component. No packet identifiers are listed for these counts, indicating these are session totals, not individual packet totals. Additionally, the table 1020 shows aggregated metrics for the individual trace results, with packet 1 having trace results from both the firewall component and overlay routing component, and packet 2 having trace results from only the firewall component.

The network management and control system, in some embodiments, can use the aggregated metrics of table 1020 to respond to various user queries. For instance, a user can query the occurrences of filtered traffic at the various observation stages during the live traffic monitoring session window, as well as a complete packet trace for each individual packet (e.g., distinguished by packet ID). Since packet counting and packet tracing metrics are associated to the same set of packets, it makes possible for users to analyze complicated issues such that packets under the same flow schema (e.g., with the same source IP address and destination IP address) are dropped occasionally, by comparing metrics produced by different monitoring actions, according to some embodiments.

Figure 11:
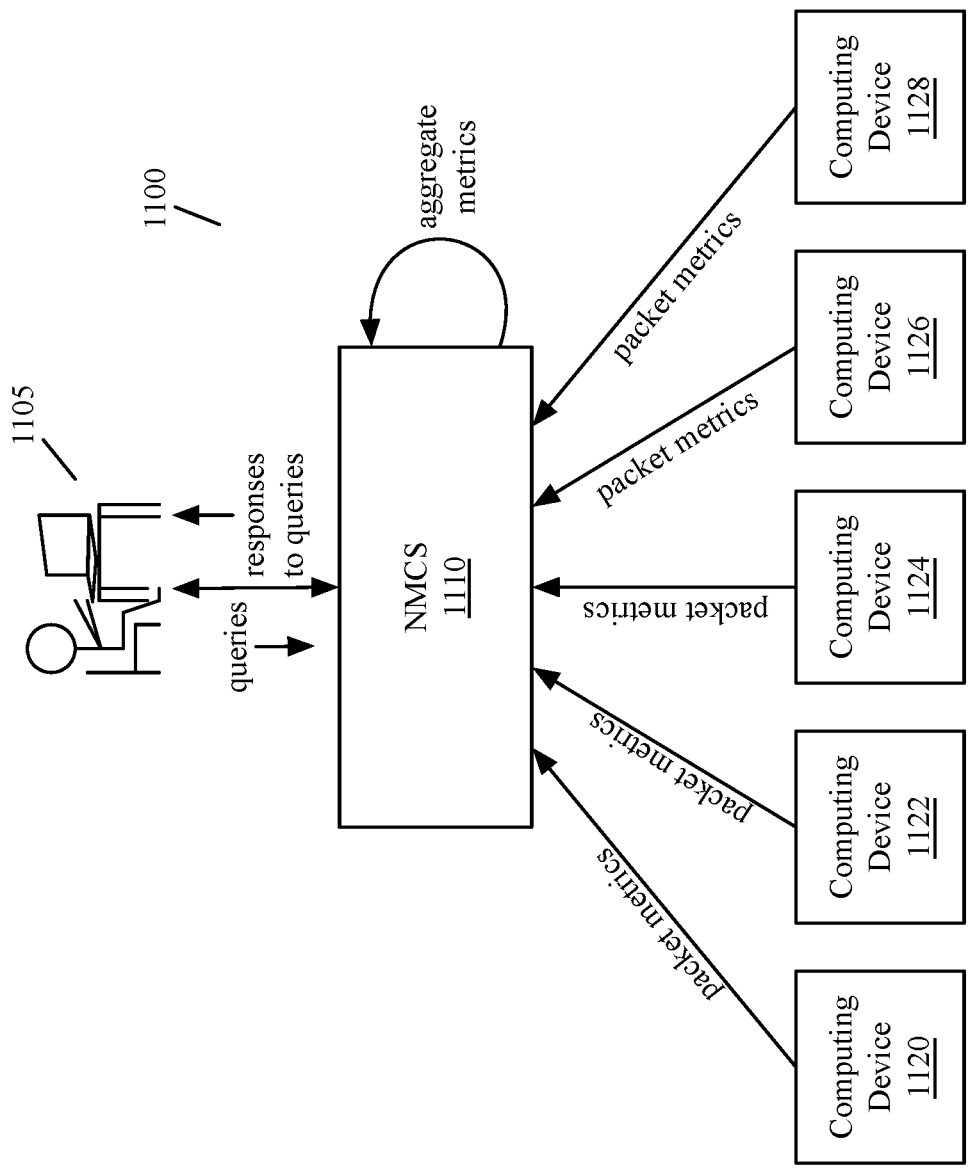
FIG. 11 illustrates a diagram showing a network management and control system collecting packet metrics for use in responding to queries from a user (e.g., administrator), in some embodiments.

FIG. 11 illustrates a network management and control system 1110 collecting packet metrics for use in responding to queries from a user (e.g., administrator), in some embodiments. As shown, the network management and control system 1110 receives packet metrics from multiple computing devices 1120-1128. It should be noted that if the computing devices 1120-1128 provide the packet metrics to a data store that is separate from the network management and control system 1110, then the network management and control system 1110 retrieves the packet metrics from this data store. However, in other embodiments, the data store is part of the network management and control system 1110 or is distributed and located on the computing devices 1120-1128 themselves.

Examples of computing devices that process the packet to perform monitoring actions and provide packet metrics to the network management and control system 1110, in some embodiments, can include the source and destination computing devices at which source and destination machines for packet flows execute, edge devices that process packets between the logical network and an external network, and/or any intermediate devices that process the packet (e.g., devices that enable the packet to be sent from one physical site to another when the logical network spans multiple sites). In some embodiments, each of these computing devices executes a staged packet processing pipeline that operates in a similar manner as described above for the initial computing device and destination computing device (except that these other devices do not apply a filtering stage to the packet).

In some embodiments, the computing devices use a synchronization mechanism for reporting the packet metrics. Specifically, within the encapsulation header (and the packet metadata stored at the computing device) of a tagged packet, the source computing device calculates and includes an indicator of the amount of time remaining in the packet monitoring session (e.g., by subtracting the time from the start of the session until the packet was detected from the time the session will end). The destination computing device for the packet (which has not received instructions from the network management and control system) receives this time remaining indicator and knows to report its metrics by a time given by the time of receipt plus the time remaining indicator (plus a latency time estimate).

In some embodiments, as the network management and control system 1110 receives packet metrics from the computing devices 1120-1128, the network management and control system 1110 aggregates the received metrics in order to respond to queries from the user 1105 for packet metrics. As discussed above, the metrics are aggregated in such a way that a user can query metrics at different levels of granularity. For example, a user can query the occurrences of filtered traffic at various observation stages during the live traffic monitoring session window (e.g., for the session as a whole), as well as a complete packet trace for each individual packet (e.g., distinguished by packet ID). Users are able to analyze complicated issues such that packets under the same flow schema (e.g., with the same source IP address and destination IP address) are dropped occasionally, by comparing metrics produced by different monitoring actions, according to some embodiments.

For example, the user 1105 can send a query to the network management and control system 1110 to determine the number of packets dropped and when these packets were dropped. Referring to table 1020, the network management and control system 1110 could be able to respond to such a query by indicating packet 2 was dropped after processing by the firewall component. The user 1105 would also be able to query the number of packets processed by each of the observation stages. Again referring to table 1020, the user would learn that the firewall component received two of two packets, while the overlay routing component received one of the two packets. Additionally, because each packet is associated with both a session identifier and a packet identifier, the user would be able to determine exactly which packets of which sessions experienced issues.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
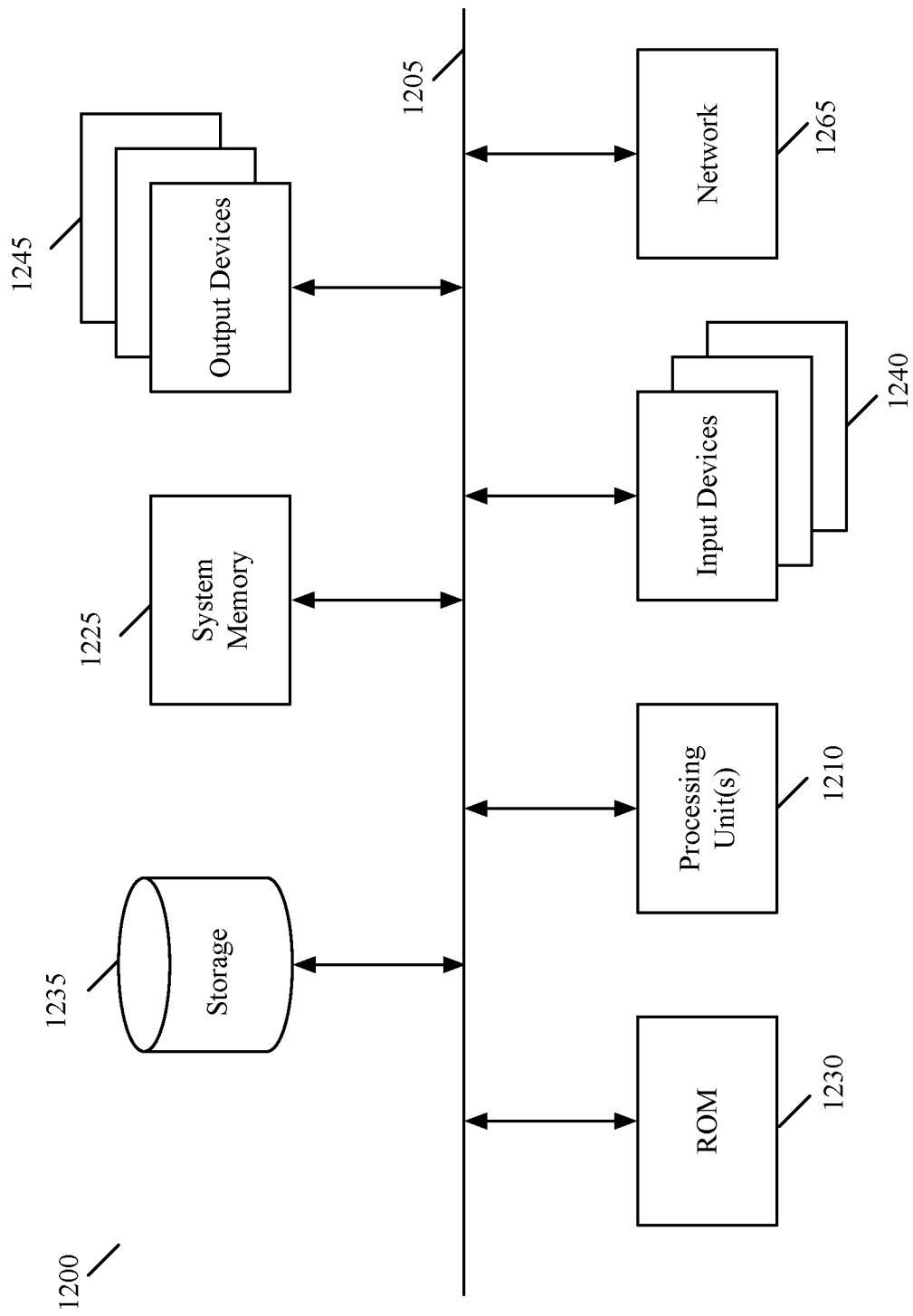
FIG. 12 conceptually illustrates a computer system with which some embodiments of the invention are implemented.

FIG. 12 conceptually illustrates a computer system 1200 with which some embodiments of the invention are implemented. The computer system 1200 can be used to implement any of the above-described hosts, controllers, gateway, and edge forwarding elements. As such, it can be used to execute any of the above described processes. This computer system 1200 includes various types of non-transitory machine-readable media and interfaces for various other types of machine-readable media. Computer system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the computer system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) 1210 may be a single processor or a multi-core processor in different embodiments. The read-only-memory (ROM) 1230 stores static data and instructions that are needed by the processing unit(s) 1210 and other modules of the computer system 1200. The permanent storage device 1235, on the other hand, is a read-and-write memory device. This device 1235 is a non-volatile memory unit that stores instructions and data even when the computer system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory 1225 is a volatile read-and-write memory, such as random access memory. The system memory 1225 stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices 1240 enable the user to communicate information and select commands to the computer system 1200. The input devices 1240 include alphanumeric keyboards and pointing devices (also called "cursor control devices"). The output devices 1245 display images generated by the computer system 1200. The output devices 1245 include printers and display devices, such as cathode ray tubes (CRT) or liquid crystal displays (LCD). Some embodiments include devices such as touchscreens that function as both input and output devices 1240 and 1245.

Finally, as shown in FIG. 12, bus 1205 also couples computer system 1200 to a network 1265 through a network adapter (not shown). In this manner, the computer 1200 can be a part of a network of computers (such as a local area network ("LAN"), a wide area network ("WAN"), or an Intranet), or a network of networks (such as the Internet). Any or all components of computer system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method for performing data traffic monitoring on a host computer, the method comprising:
for each particular packet processing operation of a plurality of packet processing operations that execute on the host computer:
receiving a packet with a tag that identifies a set of monitoring actions for one or more packet processing operations to perform;
using the tag to determine whether the packet processing operation should perform any monitoring actions, when the determination is that monitoring actions should be performed, executing any monitoring action specified for the particular packet processing operation; and
forwarding the packet to a next stage in the packet processing pipeline or towards a destination of the packet, wherein the tag is associated with monitoring actions for sequent stages for filter matching.

2. The method of claim 1, wherein a filtering stage operating on the host computer associates the packet with the tag to identify the set of monitoring actions for one or more packet processing operations to perform.

3. The method of claim 1, wherein one packet processing stage encapsulates the packet with an encapsulation header that stores the tag before the encapsulated packet is forwarded to a second host computer that provides the tag to direct monitoring operations of a plurality of packet processing operations executing on the second host computer.

4. The method of claim 1 further comprising:
at each particular packet processing stage:
when the packet specifies a set of monitoring action, determining whether the monitoring actions in the set are supported by the packet processing stage; and
executing the supported monitoring actions on the packet in addition to processing the packet according to configuration data for the stage.

5. The method of claim 4, wherein a first packet processing stage supports a particular monitoring action that is not supported by a second packet processing stage.

6. The method of claim 1, wherein the packet is a first packet of a packet flow from a source machine executing on the host computer, and the monitoring actions of each particular packet processing operation is performed for other packets in the packet flow.

7. The method of claim 1 further comprising:
at the host computer:
receiving a request to perform the set of monitoring actions for a subset of one or more packet flows;
configuring a filtering stage to identify the packet flows in the subset of flows and to associate each identified packet flow with the tag that identifies the set of monitoring actions.

8. The method of claim 7 further comprising re-configuring the filtering stage to end the monitoring in response to receiving another request to terminate the monitoring.

9. The method of claim 1, wherein the packet is a first packet, the method further comprising:
at each particular packet processing operation that executes on the host computer:
receiving a second packet to be processed by the particular packet processing pipeline;
determining that the second packet is not associated with the tag; and
performing the particular packet processing operation without performing any monitoring action on the second packet.

10. The method of claim 1, wherein:
the set of monitoring actions are stored in metadata of the packet in a priority order; and
for a packet processing stage that supports at least two monitoring actions in the set of monitoring actions, executing the at least two monitoring actions on the received packet comprises executing the at least two monitoring actions in the priority order.

11. A non-transitory machine-readable medium storing set of instructions which when executed by at least one processing unit performs data traffic monitoring, the sets of instructions:
for each particular packet processing operation of a plurality of packet processing operations that execute on the host computer:
receiving a packet with a tag that identifies a set of monitoring actions for one or more packet processing operations to perform;
using the tag to determine whether the packet processing operation should perform any monitoring actions, when the determination is that monitoring actions should be performed, executing any monitoring action specified for the particular packet processing operation; and
forwarding the packet to a next stage in the packet processing pipeline or towards a destination of the packet;
wherein the tag is associated with monitoring actions for sequent stages for filter matching.

12. The non-transitory machine-readable medium of claim 11, wherein a filtering stage operating on the host computer associates the packet with the tag to identify the set of monitoring actions for one or more packet processing operations to perform.

13. The non-transitory machine-readable medium of claim 11, wherein one packet processing stage encapsulates the packet with an encapsulation header that stores the tag before the encapsulated packet is forwarded to a second host computer that provides the tag to direct monitoring operations of a plurality of packet processing operations executing on the second host computer.

14. The non-transitory machine-readable medium of claim 11, wherein the sets of instructions are further for:
at each particular packet processing stage:
when the packet specifies a set of monitoring action, determining whether the monitoring actions in the set are supported by the packet processing stage; and
executing the supported monitoring actions on the packet in addition to processing the packet according to configuration data for the stage.

15. The non-transitory machine-readable medium of claim 14, wherein a first packet processing stage supports a particular monitoring action that is not supported by a second packet processing stage.

16. The non-transitory machine-readable medium of claim 11, wherein the packet is a first packet of a packet flow from a source machine executing on the host computer, and the monitoring actions of each particular packet processing operation is performed for other packets in the packet flow.

17. The non-transitory machine-readable medium of claim 11, wherein the sets of instructions are further for:
receiving a request to perform the set of monitoring actions for a subset of one or more packet flows;
configuring a filtering stage to identify the packet flows in the subset of flows and to associate each identified packet flow with the tag that identifies the set of monitoring actions.

18. The non-transitory machine-readable medium of claim 17, wherein the sets of instructions are further for re-configuring the filtering stage to end the monitoring in response to receiving another request to terminate the monitoring.

19. The non-transitory machine-readable medium of claim 1, wherein the packet is a first packet, and the sets of instructions are further for:
at each particular packet processing operation that executes on the host computer:
receiving a second packet to be processed by the particular packet processing pipeline;
determining that the second packet is not associated with the tag; and
performing the particular packet processing operation without performing any monitoring action on the second packet.

20. The non-transitory machine-readable medium of claim 11, wherein:
the set of monitoring actions are stored in metadata of the packet in a priority order; and
the sets of instructions are further for executing, for a packet processing stage that supports at least two monitoring actions in the set of monitoring actions, the two monitoring actions on the received packet in the priority order.

* * * * *